United States Patent
Mou et al.

(10) Patent No.: US 12,013,151 B2
(45) Date of Patent: Jun. 18, 2024

(54) METHOD OF FILTERING INDOOR AIR POLLUTION

(71) Applicant: Microjet Technology Co., Ltd., Hsinchu (TW)

(72) Inventors: Hao-Jan Mou, Hsinchu (TW);
Ching-Sung Lin, Hsinchu (TW);
Chin-Chuan Wu, Hsinchu (TW);
Yung-Lung Han, Hsinchu (TW);
Chi-Feng Huang, Hsinchu (TW);
Tsung-I Lin, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 37 days.

(21) Appl. No.: 17/546,791

(22) Filed: Dec. 9, 2021

(65) Prior Publication Data
US 2022/0196269 A1    Jun. 23, 2022

(30) Foreign Application Priority Data

Dec. 21, 2020    (TW) .................................. 109145359

(51) Int. Cl.
*F24F 8/95*    (2021.01)
*F24F 8/108*    (2021.01)
(Continued)

(52) U.S. Cl.
CPC ................ *F24F 8/95* (2021.01); *F24F 8/108* (2021.01); *F24F 11/58* (2018.01); *F24F 11/63* (2018.01); *F24F 11/74* (2018.01); *F24F 2110/64* (2018.01)

(58) Field of Classification Search
CPC ........ F24F 11/30; F24F 11/70; F24F 2221/42; F24F 11/56; F24F 2110/50; F24F 11/58;
(Continued)

(56) References Cited

U.S. PATENT DOCUMENTS 6,036,738 A * 3/2000 Shanbrom .............. B01D 46/10
55/DIG. 35
7,302,313 B2 * 11/2007 Sharp .................. G01N 33/0075
700/282
(Continued)

FOREIGN PATENT DOCUMENTS

CN    103341408 A    10/2013
CN    107702267 A    2/2018
(Continued)

OTHER PUBLICATIONS

Patil, Green synthesis of silver nanoparticles by microorganism using organic pollutant: its antimicrobial and catalytic application S. V. Otari & R. M. Patil & N. H (Year: 2014).*
(Continued)

*Primary Examiner* — Darrin D Dunn
(74) *Attorney, Agent, or Firm* — Birch, Stewart, Kolasch & Birch, LLP

(57) ABSTRACT

A method of filtering indoor air pollution for filtering air pollutant in an indoor space is disclosed. A plurality of gas processing devices is provided for detecting and filtering air pollutant, and transmitting device inner gas detection data. A connection device is provided for receiving and transmitting the device inner gas detection data to a cloud processing device. The cloud processing device intelligently compares and selects to drive a closest gas processing device to filter the air pollutant and drive the gas processing devices to determine a convection path and generate at least one airflow. The airflow accelerates the movement of the air pollutant along the convection path to move the air pollutant towards the closest processing device adjacent to the air pollutant for filtering, so that the air pollutant in the indoor space can be filtered rapidly to obtain a clean, safe and breathable air condition.

18 Claims, 22 Drawing Sheets

(51) Int. Cl.
*F24F 11/58* (2018.01)
*F24F 11/63* (2018.01)
*F24F 11/74* (2018.01)
*F24F 110/64* (2018.01)

(58) Field of Classification Search
CPC ...... F24F 11/64; F24F 8/80; F24F 1/02; F24F 11/54; F24F 11/74; F24F 11/77; F24F 13/28; F24F 3/044; F24F 8/10; F24F 8/167; F24F 1/0073; F24F 3/16; F24F 2221/38; F24F 2221/125; G05B 15/02; G05B 19/042; G05B 2219/2614; G05B 2219/45098; G05B 19/02; G05B 19/048; G05B 2219/39117; G05B 2219/39167; G05B 23/0286; G05B 2219/2642
See application file for complete search history.

(56) References Cited

U.S. PATENT DOCUMENTS

| | | | | |
|---|---|---|---|---|
| 7,389,158 | B2 * | 6/2008 | Desrochers | G01N 1/26 |
| | | | | 700/277 |
| 7,824,626 | B2 * | 11/2010 | Kwiatkowski | F24F 3/16 |
| | | | | 422/292 |
| 8,655,489 | B2 * | 2/2014 | Horiuchi | F24F 11/52 |
| | | | | 700/276 |
| 8,907,803 | B2 * | 12/2014 | Martin | G01N 33/0075 |
| | | | | 340/634 |
| 9,008,839 | B1 * | 4/2015 | Kuffner, Jr. | G05B 19/4187 |
| | | | | 700/248 |
| 9,119,814 | B2 * | 9/2015 | Kim | B01D 46/0028 |
| 9,194,601 | B2 * | 11/2015 | Kuroiwa | F24F 11/62 |
| 9,200,813 | B2 * | 12/2015 | Harayama | G06F 30/23 |
| 9,375,847 | B2 * | 6/2016 | Angle | H04L 12/282 |
| 9,862,247 | B2 * | 1/2018 | Perkins | B60H 1/00871 |
| 9,983,580 | B2 * | 5/2018 | Km | G05D 1/0038 |
| 10,089,586 | B2 * | 10/2018 | Vestal | G05D 1/0274 |
| 10,145,576 | B2 * | 12/2018 | Boufounos | G05B 13/04 |
| 10,365,004 | B2 * | 7/2019 | Nishii | F24F 11/52 |
| 10,443,874 | B2 * | 10/2019 | Tang | F24F 11/30 |
| 10,543,597 | B1 * | 1/2020 | Baroudi | B25J 9/1661 |
| 10,636,271 | B2 * | 4/2020 | Chang | B60H 1/24 |
| 10,641,512 | B2 * | 5/2020 | Otsuki | F24F 11/64 |
| 10,684,264 | B2 * | 6/2020 | Caussy | G05D 1/0242 |
| 10,690,372 | B2 * | 6/2020 | Arens | F24F 13/32 |
| 10,753,634 | B2 * | 8/2020 | Edwards | F24F 11/62 |
| 10,775,068 | B2 * | 9/2020 | Lee | G06F 16/904 |
| 10,871,302 | B2 * | 12/2020 | Song | F24F 11/64 |
| 10,878,294 | B2 * | 12/2020 | Jones | A47L 9/009 |
| 11,187,419 | B2 * | 11/2021 | Aleti | F24F 11/64 |
| 11,301,779 | B2 * | 4/2022 | Song | F24F 11/30 |
| 11,365,899 | B2 * | 6/2022 | Hartman | F24F 11/523 |
| 11,384,950 | B2 * | 7/2022 | Nourbakhsh | F24F 11/72 |
| 11,400,404 | B2 * | 8/2022 | Kim | B01D 46/442 |
| 11,531,311 | B2 * | 12/2022 | Matsumoto | F24F 11/74 |
| 11,540,248 | B2 * | 12/2022 | Scialò | H02J 7/0048 |
| 11,708,992 | B2 * | 7/2023 | Kimura | F24F 11/62 |
| | | | | 62/186 |
| 2003/0173579 | A1 * | 9/2003 | Ishii | H01L 25/072 |
| | | | | 257/178 |
| 2006/0064204 | A1 * | 3/2006 | Kim | F24F 11/56 |
| | | | | 700/276 |
| 2010/0036533 | A1 * | 2/2010 | Masuda | F24F 11/30 |
| | | | | 700/278 |
| 2010/0173167 | A1 * | 7/2010 | Vissing | B05D 5/08 |
| | | | | 427/508 |
| 2011/0064605 | A1 | 3/2011 | Hedman | |
| 2013/0170417 | A1 * | 7/2013 | Thomas | H04W 52/0216 |
| | | | | 370/311 |
| 2014/0260692 | A1 | 9/2014 | Sharp | |
| 2015/0033842 | A1 | 2/2015 | Zhang | |
| 2015/0202565 | A1 | 7/2015 | Qi et al. | |
| 2015/0273984 | A1 * | 10/2015 | Suzuki | B60K 35/00 |
| | | | | 454/152 |
| 2015/0290998 | A1 * | 10/2015 | Lustbader | B60H 1/00271 |
| | | | | 454/141 |
| 2016/0131391 | A1 * | 5/2016 | He | F24F 11/79 |
| | | | | 454/292 |
| 2016/0209073 | A1 * | 7/2016 | Masuda | F24F 11/62 |
| 2017/0130978 | A1 * | 5/2017 | Edwards | F24F 11/79 |
| 2017/0130981 | A1 | 5/2017 | Willette et al. | |
| 2017/0261979 | A1 * | 9/2017 | Km | G01N 33/0034 |
| 2017/0284690 | A1 * | 10/2017 | Lipanov | F24F 11/58 |
| 2018/0135879 | A1 * | 5/2018 | Ota | F24F 11/80 |
| 2018/0156483 | A1 * | 6/2018 | Kim | F24F 11/30 |
| 2018/0209681 | A1 * | 7/2018 | Song | F24F 11/77 |
| 2018/0328615 | A1 * | 11/2018 | Lo | F24F 11/745 |
| 2019/0051135 | A1 * | 2/2019 | Semanoukian | G08B 21/12 |
| 2019/0056127 | A1 * | 2/2019 | Piech | F24F 11/30 |
| 2019/0108746 | A1 * | 4/2019 | Chang | B60H 1/008 |
| 2019/0186759 | A1 * | 6/2019 | Komatsu | F24F 11/80 |
| 2019/0381443 | A1 | 12/2019 | Kim et al. | |
| 2020/0033016 | A1 * | 1/2020 | Ogura | F24F 11/79 |
| 2020/0224915 | A1 * | 7/2020 | Nourbakhsh | F24F 11/54 |
| 2021/0003310 | A1 * | 1/2021 | Shnaiderman | F24F 11/30 |
| 2021/0072713 | A1 * | 3/2021 | Matsumoto | F24F 11/79 |
| 2021/0151164 | A1 * | 5/2021 | Macary | A61M 21/02 |
| 2021/0161351 | A1 * | 6/2021 | Lee | A47L 9/2805 |
| 2021/0204202 | A1 * | 7/2021 | Krishnan | H04W 48/16 |
| 2021/0310683 | A1 * | 10/2021 | Edwards | F24F 11/58 |
| 2021/0364171 | A1 * | 11/2021 | Kleinberger | F24F 8/192 |
| 2022/0034542 | A1 * | 2/2022 | Peters | F24F 11/0001 |
| 2022/0170661 | A1 * | 6/2022 | Bonzani, Jr. | B03C 3/011 |
| 2022/0192454 | A1 * | 6/2022 | Viengkham | A61L 9/20 |
| 2022/0280897 | A1 * | 9/2022 | Mou | B01D 53/007 |
| 2023/0066057 | A1 * | 3/2023 | Fan | F24F 11/62 |
| 2023/0109493 | A1 * | 4/2023 | de Jong | F24F 8/22 |
| | | | | 454/191 |

FOREIGN PATENT DOCUMENTS

| | | |
|---|---|---|
| CN | 108697965 A | 10/2018 |
| CN | 110458147 A | 11/2019 |
| CN | 110631181 A | 12/2019 |
| CN | 110718051 A | 1/2020 |
| CN | 209910077 U | 1/2020 |
| CN | 111246377 A | 6/2020 |
| CN | 210775135 U | 6/2020 |
| EP | 3 581 854 A1 | 12/2019 |
| JP | 2005-504947 A | 2/2005 |
| JP | 2018-132246 A | 8/2018 |
| JP | 2019-27778 A | 2/2019 |
| KR | 10-2010-0117305 A | 11/2010 |
| KR | 20110040630 | * 10/2011 |
| KR | 10-2018-0127564 A | 11/2018 |
| TW | I569818 B | * 9/2015 |
| TW | I562818 B | 12/2016 |
| TW | M561765 U | 6/2018 |
| TW | I645136 B | 12/2018 |
| TW | 202006332 A | 2/2020 |
| TW | 202007436 A | 2/2020 |
| WO | WO 2016/175473 A1 | 11/2016 |
| WO | WO2019/044251 A1 | 3/2019 |
| WO | WO2020/208823 A1 | 10/2020 |

OTHER PUBLICATIONS

Extended European Search Report for European Application No. 21215107.0, dated May 16, 2022.

* cited by examiner

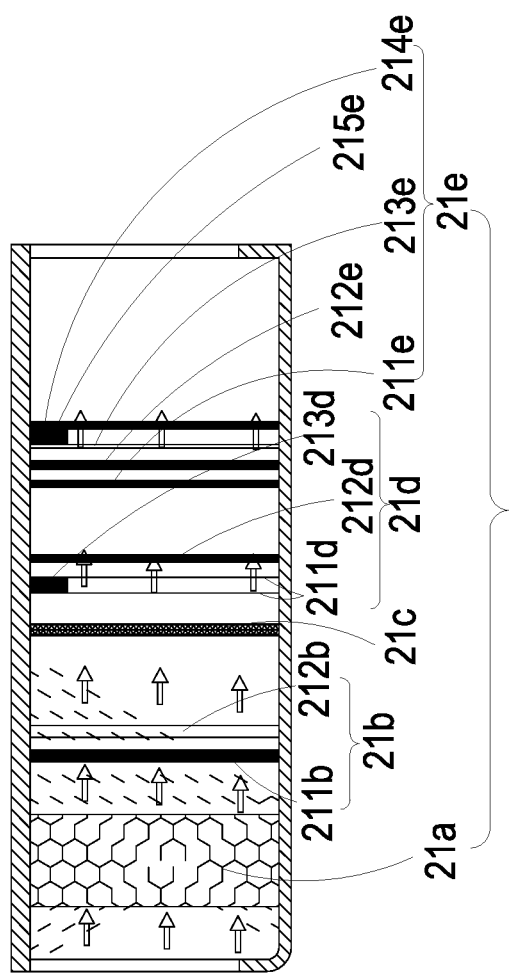

METHOD OF FILTERING INDOOR AIR POLLUTION

FIELD OF THE INVENTION

The present disclosure relates to a method of filtering air pollution in an indoor space, so that the air pollution in the indoor space can be filtered rapidly into a clean, safe and breathable air condition.

BACKGROUND OF THE INVENTION

In recent, people pay more and more attention to the air quality around our daily lives. Particulate matter (PM), such as PM1, PM2.5, PM10, carbon dioxide, total volatile organic compounds (TVOC), formaldehyde and even the suspended particles, the aerosols, the bacteria, the viruses, etc. contained in the air and exposed in the environment might affect the human health, and even endanger people's life in severe situation.

However, indoor air quality is not easy to control, except for the reason of outdoor air quality, the main reasons affect indoor air quality are resulted from the situations of the air-conditioner and/or the pollution source, especially the dust result from poor indoor air circulation. In order to improve indoor air quality and obtain good air quality in the indoor environment, people usually use equipments, such as an air-conditioner and/or an air-cleaner, to achieve the purpose of improving indoor air quality. However, the air-conditioner and the air-cleaner are machines designed for indoor circulation but for eliminating most of the harmful gases, especially the harmful gases like carbon monoxide (CO) or carbon dioxide ($CO_2$).

Therefore, it is the object of the invention to provide a solution for air purification by purifying and promoting the air quality in real time, so as to prevent people from breathing harmful gases in the indoor environment, and to monitor the indoor air quality in real time anytime and anywhere, and to filter the indoor air pollutant quickly when the indoor air quality is poor, which are issues of concern developed in the present disclosure.

SUMMARY OF THE INVENTION

An object of the present disclosure is to provide a method of filtering indoor air pollution. In accordance with an aspect of the present disclosure, a cloud processing device is provided for receiving device inner gas detection data of a plurality of gas processing devices, and selecting the gas processing device with the highest device inner gas detection data as the one closest to the air pollutant for driving. Consequently, the air pollutant can move towards the closest gas processing device for filtering the air pollutant, so that the air pollutant in the indoor space can be filtered rapidly, so as to obtain a clean, safe and breathable air condition.

In accordance with an aspect of the present disclosure, a method of filtering indoor air pollution is provided and includes: a) providing a plurality of gas processing devices for detecting and filtering air pollutant, and transmitting at least one device inner gas detection data; b) providing a connection device for receiving and transmitting the at least one device inner gas detection data to a cloud processing device, wherein the cloud processing device intelligently compares and selects to drive a closest gas processing device adjacent to the air pollutant, and determines a convection path for the air pollutant; and c) intelligently selecting and controlling the enablement of the plurality of gas processing devices by the cloud processing device and generate at least one airflow, so as to accelerate the movement of the air pollutant along the convection path to move the air pollutant towards the closest gas processing devices adjacent to the air pollutant for filtering, so that the air pollutant in the indoor space can be filtered rapidly, so as to obtain a clean, safe and breathable air condition.

In an embodiment, after the cloud processing device received the device inner gas detection data of the plurality of gas processing devices, it selects a gas processing device with the highest device inner gas detection data as the closest gas processing device adjacent to the air pollutant for driving. The cloud processing device transmits a control instruction to the connection device. The connection device then transmits the control instruction to the closest gas processing device adjacent to the air pollutant for driving the closest gas processing device, and intelligently selects the activation and operation time of the closest gas processing device, so as to filter the air pollutant.

In an embodiment, the cloud processing device intelligently compares every device inner gas detection data to determine a convection path for the air pollutant, selects and transmits a control instruction to the connection device, and intelligently selects and drives at least one of the plurality of gas processing devices in the indoor space to generate at least one airflow according to the convection path. The at least one airflow accelerates the movement of the air pollutant along the convection path, so that the air pollutant can move towards the closest gas processing device adjacent to the air pollutant for filtering.

BRIEF DESCRIPTION OF THE DRAWINGS

The above contents of the present disclosure will become more readily apparent to those ordinarily skilled in the art after reviewing the following detailed description and accompanying drawings, in which:

FIG. 2C is a cross-sectional view illustrating a filter unit according to the embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIGS. 1 to 11. The present disclosure provides a method of filtering indoor air pollution of air pollutant B in an indoor space A. The method is described in detail as follows.

Figure 1:
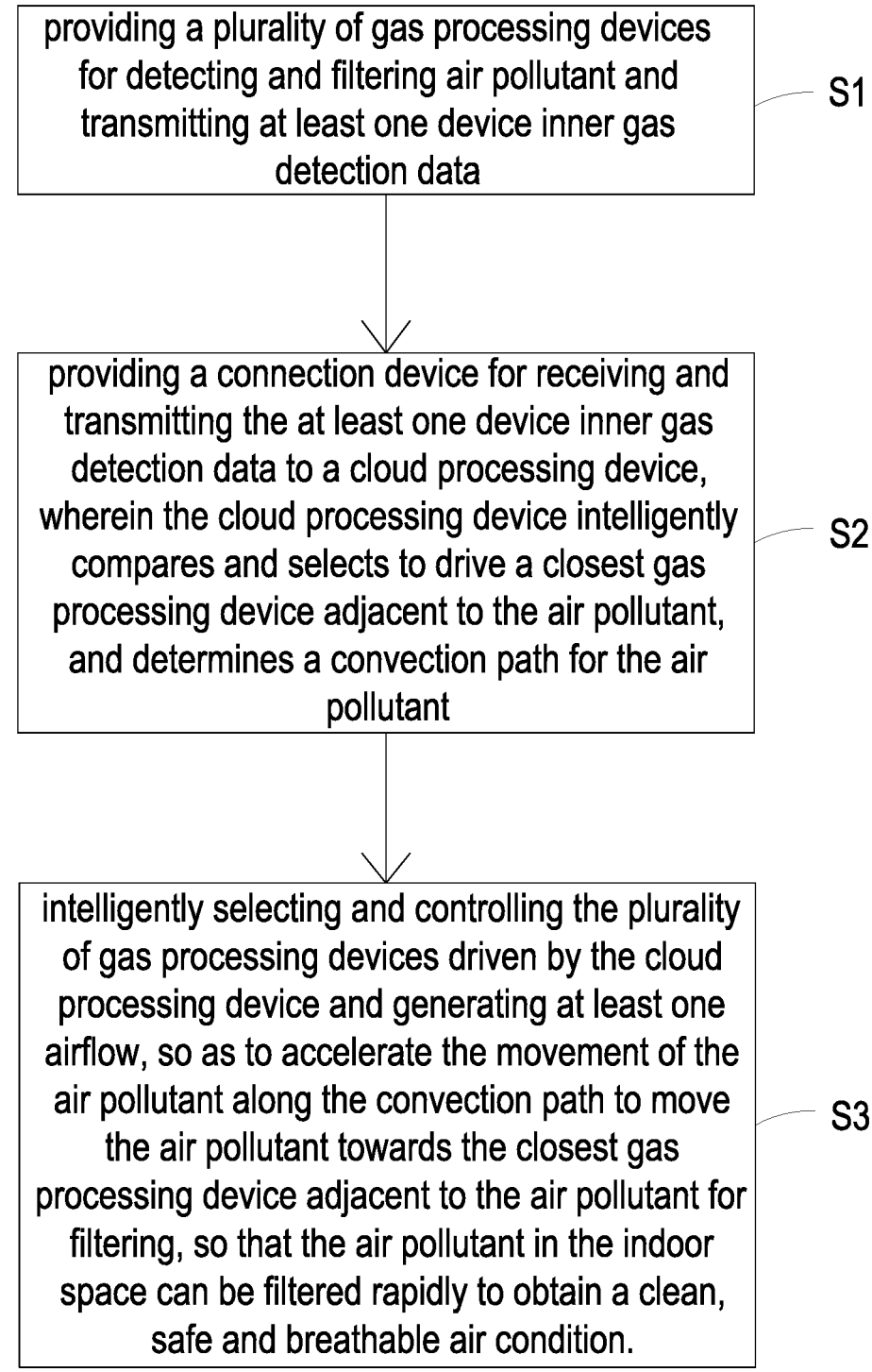
FIG. 1 is a flow chart of a method of filtering indoor air pollution according to an embodiment of the present invention.
Figure 2A:
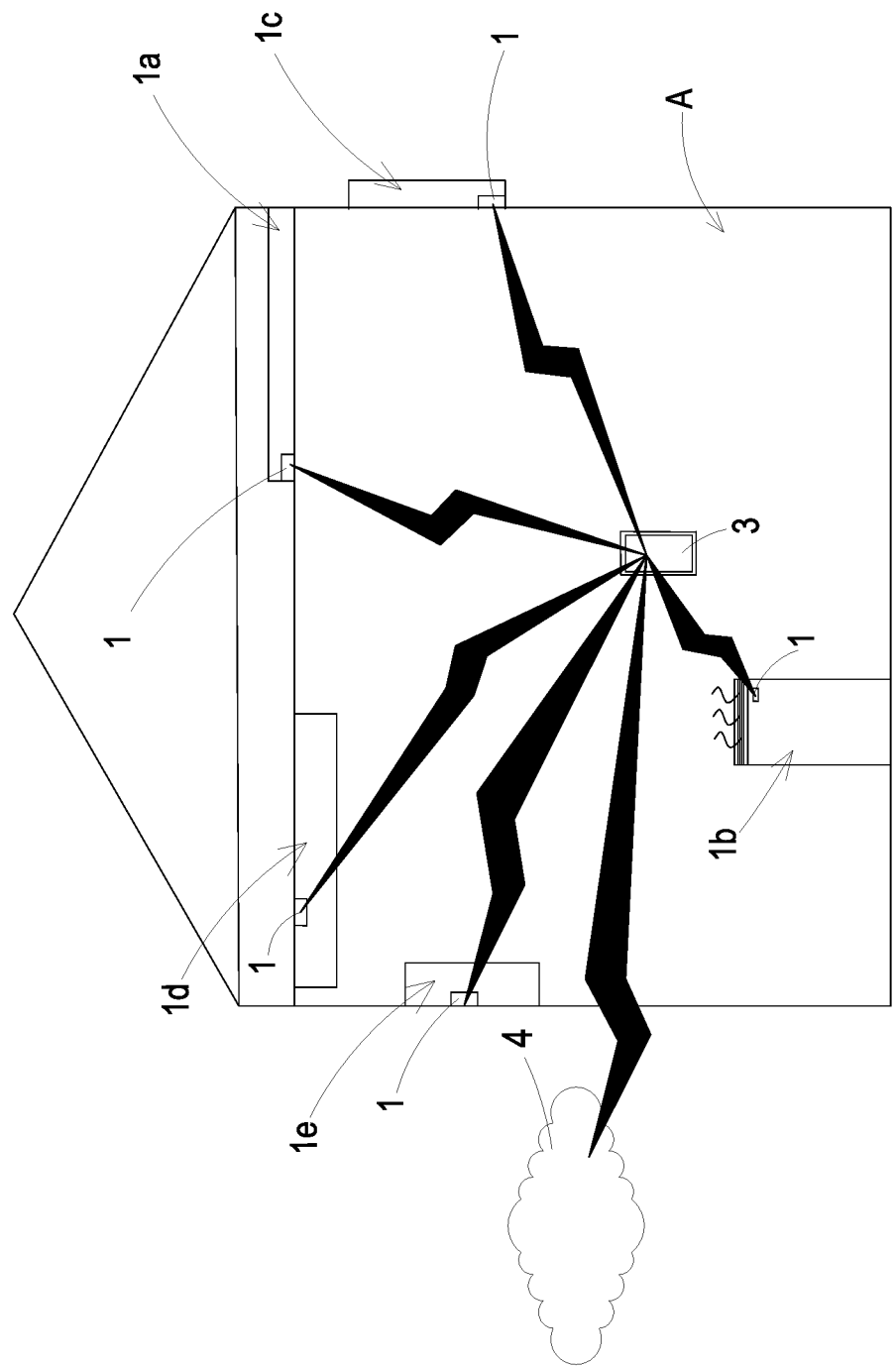
FIG. 2A is a first exemplary schematic diagram illustrating the method of filtering indoor air pollution in an indoor space according to the embodiment of the present disclosure.
Figure 2B:
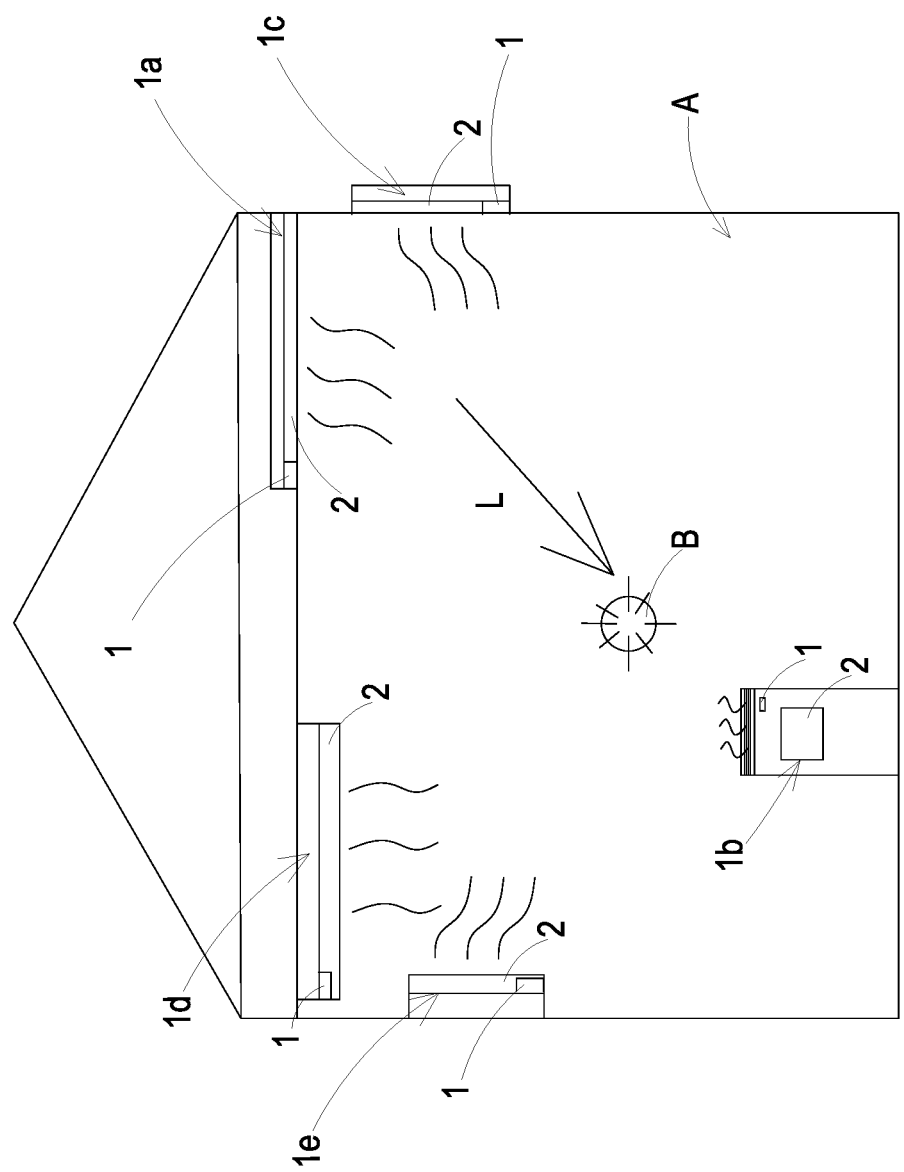
FIG. 2B is a second exemplary schematic diagram illustrating the method of filtering indoor air pollution in the indoor space according to the embodiment of the present disclosure.

As shown in FIGS. 1 to 2B, in step S1 of the method, a plurality of gas processing devices (including an air-exchanger 1a, an air-cleaner 1b, an air-conditioner 1c, an exhauster 1d and a ventilator 1e) are provided. The plurality of gas processing devices are provided for detecting and filtering air pollutant B, and transmitting at least one device inner gas detection data. Each of the plurality of gas processing devices comprises a gas detection module 1 and a filter unit 2, wherein the gas detection module 1 is for detecting the air pollutant B in the environment where the plurality of gas processing devices are installed and generates the corresponding device inner gas detection data, and the filter unit 2 is for filtering the air pollutant B.

In step S2 of the method, a connection device 3 is provided for receiving the device inner gas detection data and transmitting to a cloud processing device 4. The cloud processing device 4 intelligently compares and selects to drive the closest gas processing device adjacent to the air pollutant B, and determines a convection path for the air pollutant B. In this step, the cloud processing device 4 receives the device inner gas detection data of each gas processing devices transmitted from the connection device 3. The cloud processing device 4 compares the device inner gas detection data to determine the region of the air pollutant B, and then drives the corresponding gas processing devices adjacent to the air pollutant B. Also, the cloud processing device 4 determines the convection path for the air pollutant B based on the device inner gas detection data and the positions of the plurality of gas processing devices.

In step S3 of the method, the cloud processing device 4 intelligently selects and controls the plurality of gas processing devices to generate at least one airflow in the convection path, so as to accelerate the movement of the air pollutant B to move along an air pollutant path L, so that the air pollutant B can move towards the closest gas processing device adjacent to the air pollutant B for filtering the air pollutant. Consequently, the air pollutant B in the indoor space A can be filtered rapidly to obtain a clean, safe and breathable air condition. In this step, after the cloud processing device 4 received the device inner gas detection data of each gas processing devices transmitted from the connection device 3, the cloud processing device 4 intelligently selects and controls the plurality of gas processing devices to generate the at least one airflow in the convection path. The at least one airflow accelerates the movement of the air pollutant B to move along the air pollutant path L, thereby the air pollutant B can move towards the gas processing device adjacent thereto and be filtered and purified by the gas processing device (as shown in FIG. 2B). Consequently, the filtering speed of the air pollutant B in indoor space A is accelerated, so as to obtain a clean, safe and breathable air condition rapidly.

After the cloud processing device 4 received the at least one device inner gas detection data of each gas processing devices transmitted from the connection device 3, the gas processing devices with the highest device inner gas detection data of the air pollutant B is selected as a closest gas processing device and a control instruction is transmitted to the connection device 3. The connection device 3 then transmits the control instruction to the closest gas processing device with highest device inner gas detection data adjacent to the air pollutant B to drive the closest gas processing device. Also, the connection device 3 intelligently selects the activation and operation time of the closest gas processing device with highest device inner gas detection data of the air pollutant B, so as to filter the air pollutant of the air pollutant B.

The cloud processing device 4 intelligently compares every device inner gas detection data to determine a convection path for the air pollutant B, and then selects the corresponding gas processing devices to be driven according to the convection path. After the selected gas processing devices received the control instruction, they are enabled to generate at least one airflow. The airflow accelerates the movement of the air pollutant B in the convection path, so that the air pollutant B can move towards the closest gas processing device along the air pollutant path L, and to be filtered and purified by the closest gas processing device.

According to the descriptions of the above method, the present disclosure provides a method of filtering indoor air pollution. The main feature of the method of filtering indoor air pollution comprises the following steps. Every device inner gas detection data of the plurality of gas processing devices are received by the connection device 3 and transmitted to the cloud processing device 4. After the cloud processing device 4 intelligently compares every device inner gas detection data received, the convection path for the air pollutant B is determined and generates airflow correspondingly. The airflow accelerates the movement of the air pollutant B in the convection path, so that the air pollutant B can move towards the closest gas processing device to be filtered and purified. Consequently, users in the indoor space A can obtain a clean, safe and breathable air condition. To achieve the above effect, the devices and processing method for implementing the present disclosure are described in detail as follows.

Figure 3:
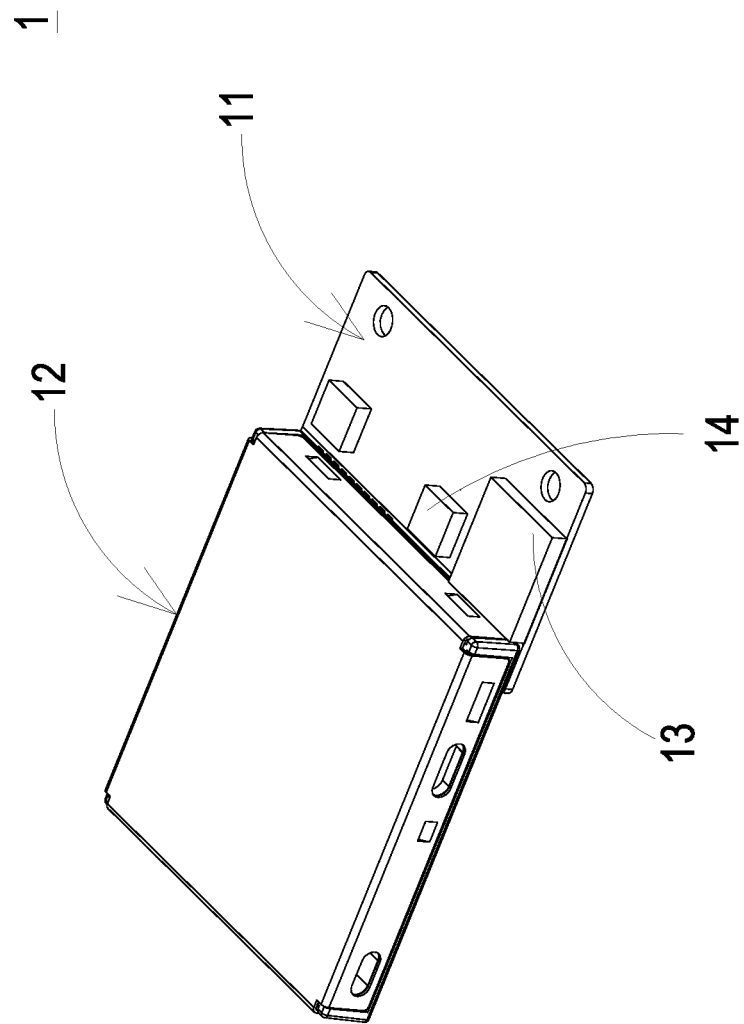
FIG. 3 is a schematic perspective view illustrating the combination of a gas detection module according to the embodiment of the present disclosure.
Figure 4A:
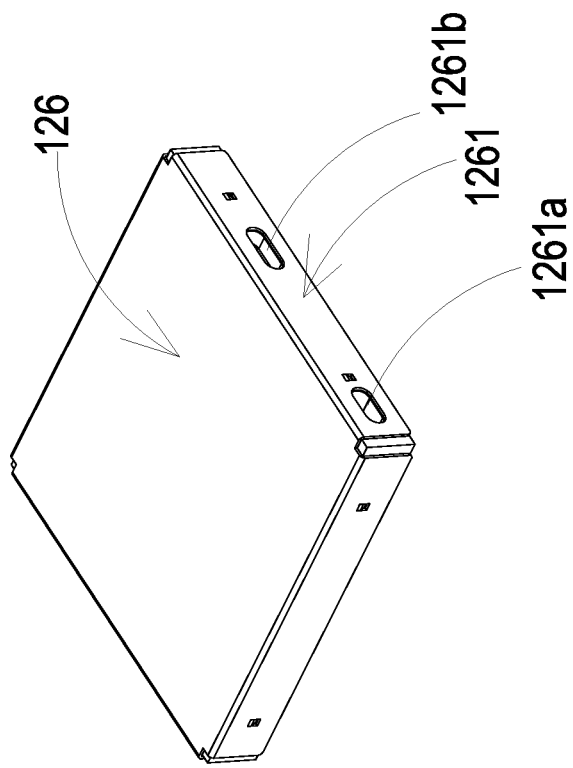
FIG. 4A is a schematic front perspective view illustrating the combination of a gas detection main part according to the embodiment of the present disclosure.
Figure 4B:
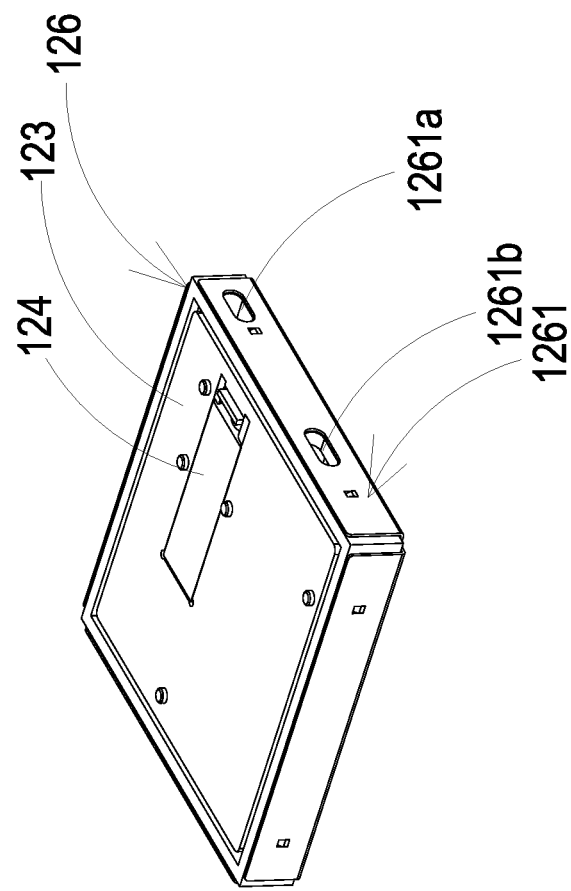
FIG. 4B a schematic rear perspective view illustrating the combination of the gas detection main part according to the embodiment of the present disclosure.
Figure 4C:
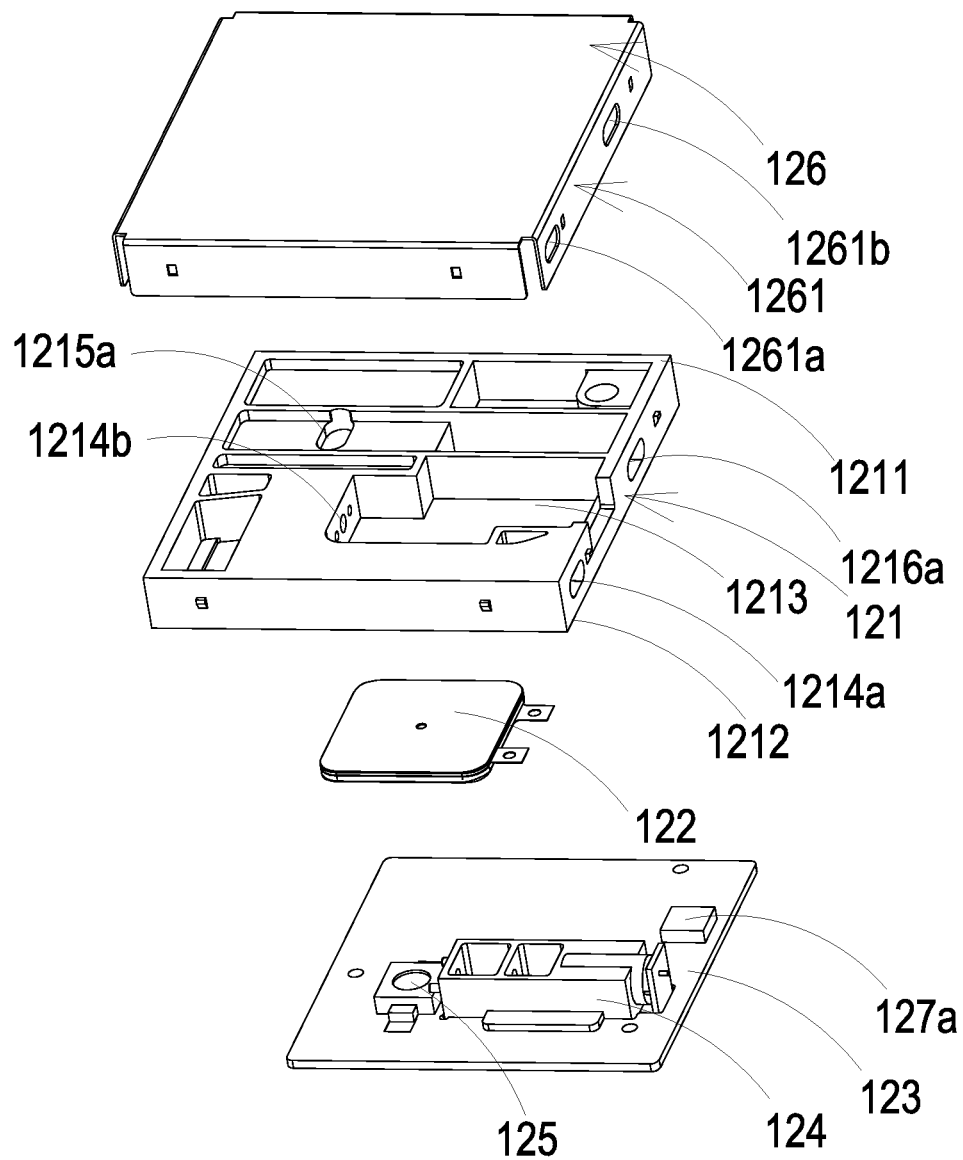
FIG. 4C is an exploded view illustrating the gas detection main part according to the embodiment of the present disclosure.
Figure 5A:
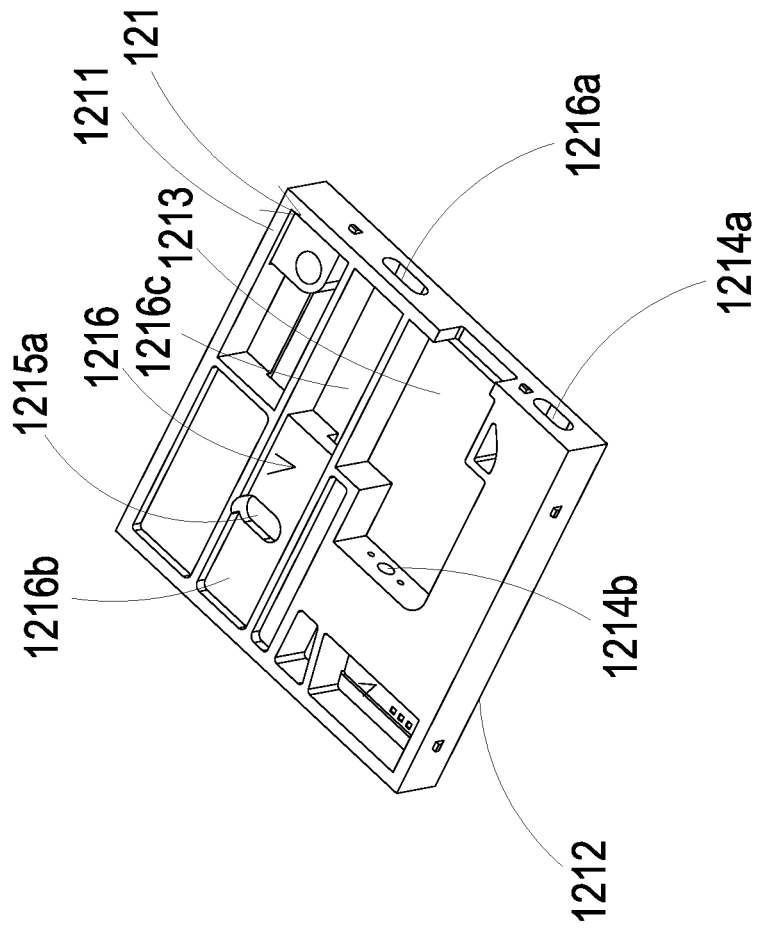
FIG. 5A is a schematic front view illustrating a base of the gas detection module according to the embodiment of the present disclosure.
Figure 5B:
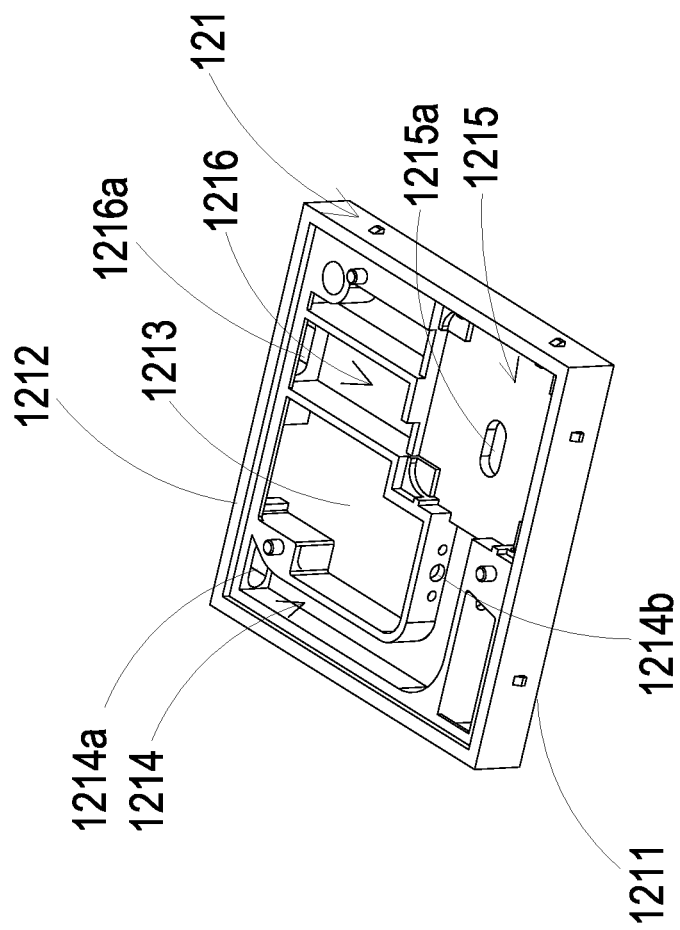
FIG. 5B is a schematic rear view illustrating the base of the gas detection module according to the embodiment of the present disclosure.
Figure 6:
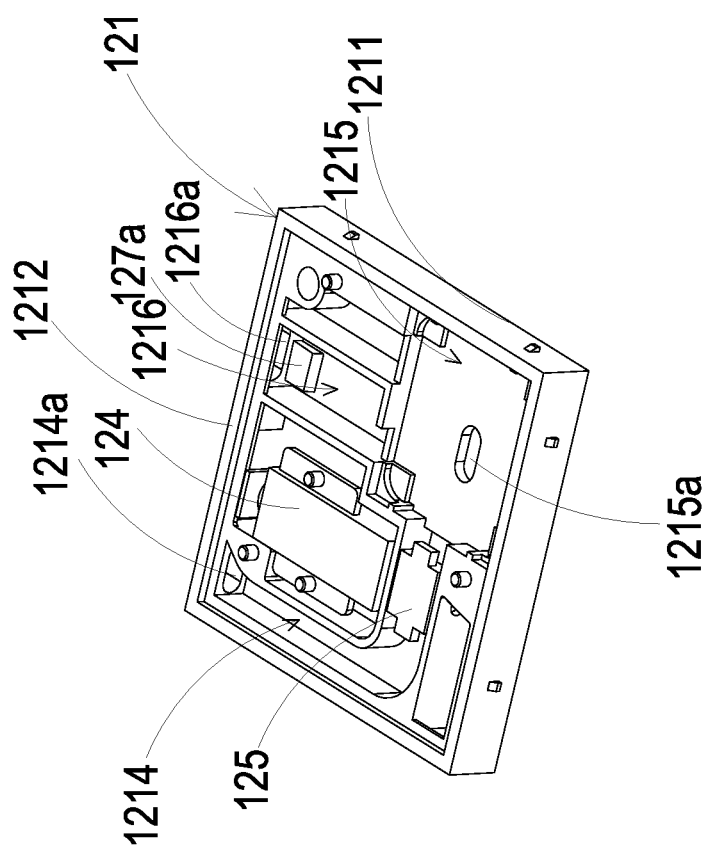
FIG. 6 is a schematic view illustrating a laser component combined within the base of the gas detection module according to the embodiment of the present disclosure.
Figure 7A:
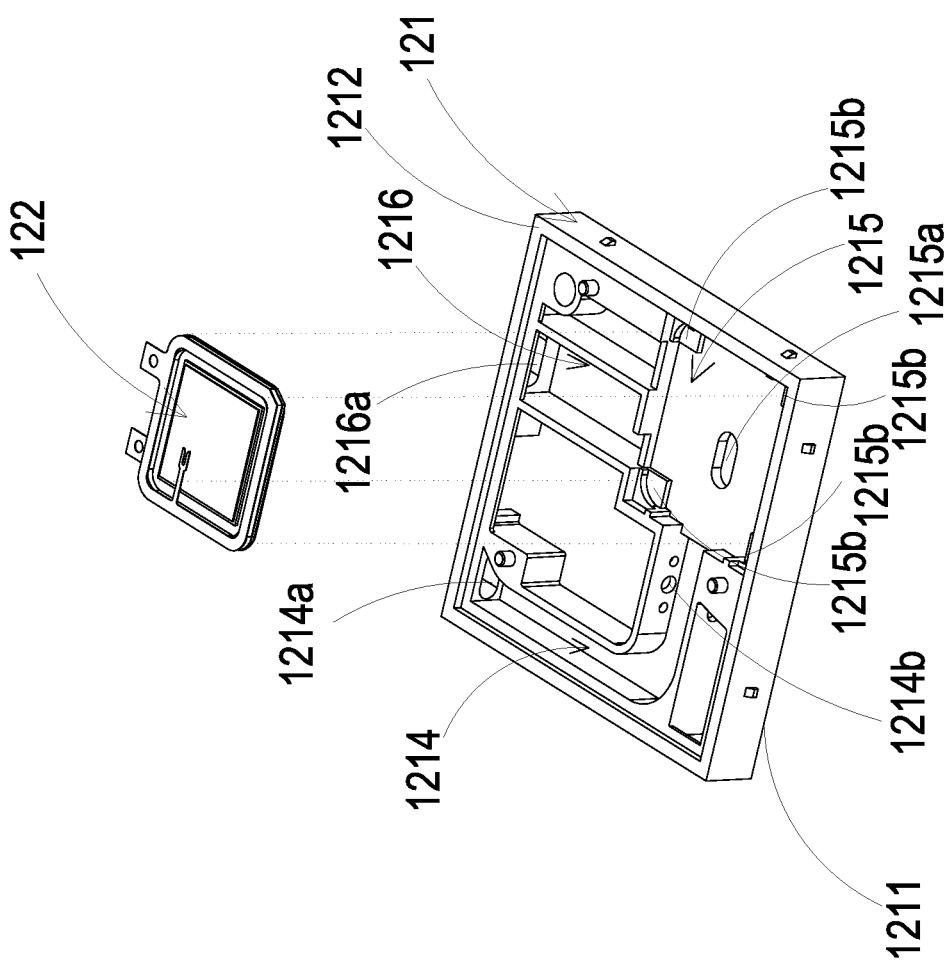
FIG. 7A is a schematic exploded view illustrating the combination of a piezoelectric actuator and the base according to the embodiment of the present disclosure.
Figure 7B:
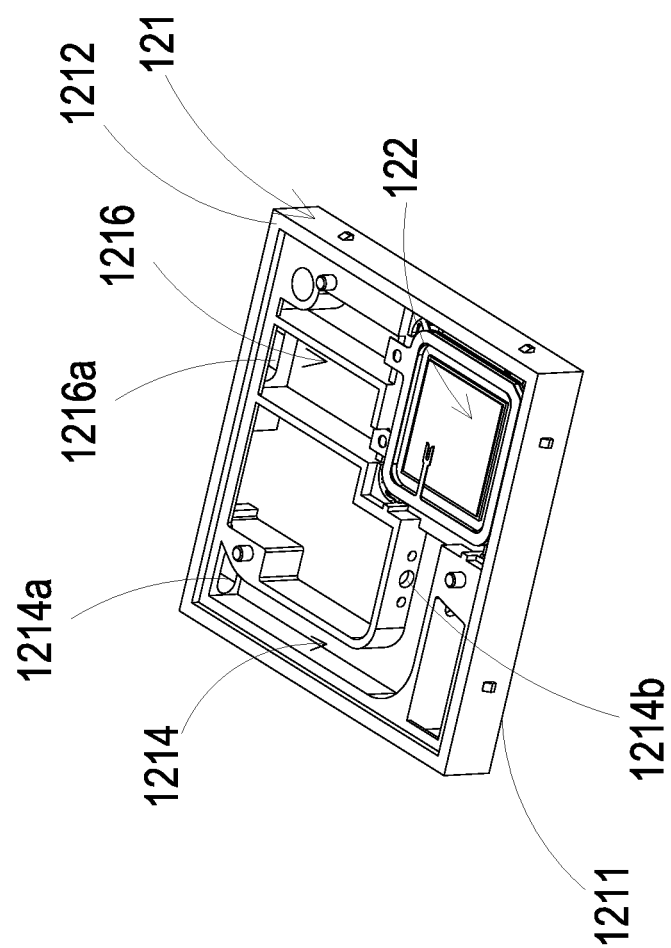
FIG. 7B is a schematic perspective view illustrating the combination of the piezoelectric actuator and the base according to the embodiment of the present disclosure.
Figure 8A:
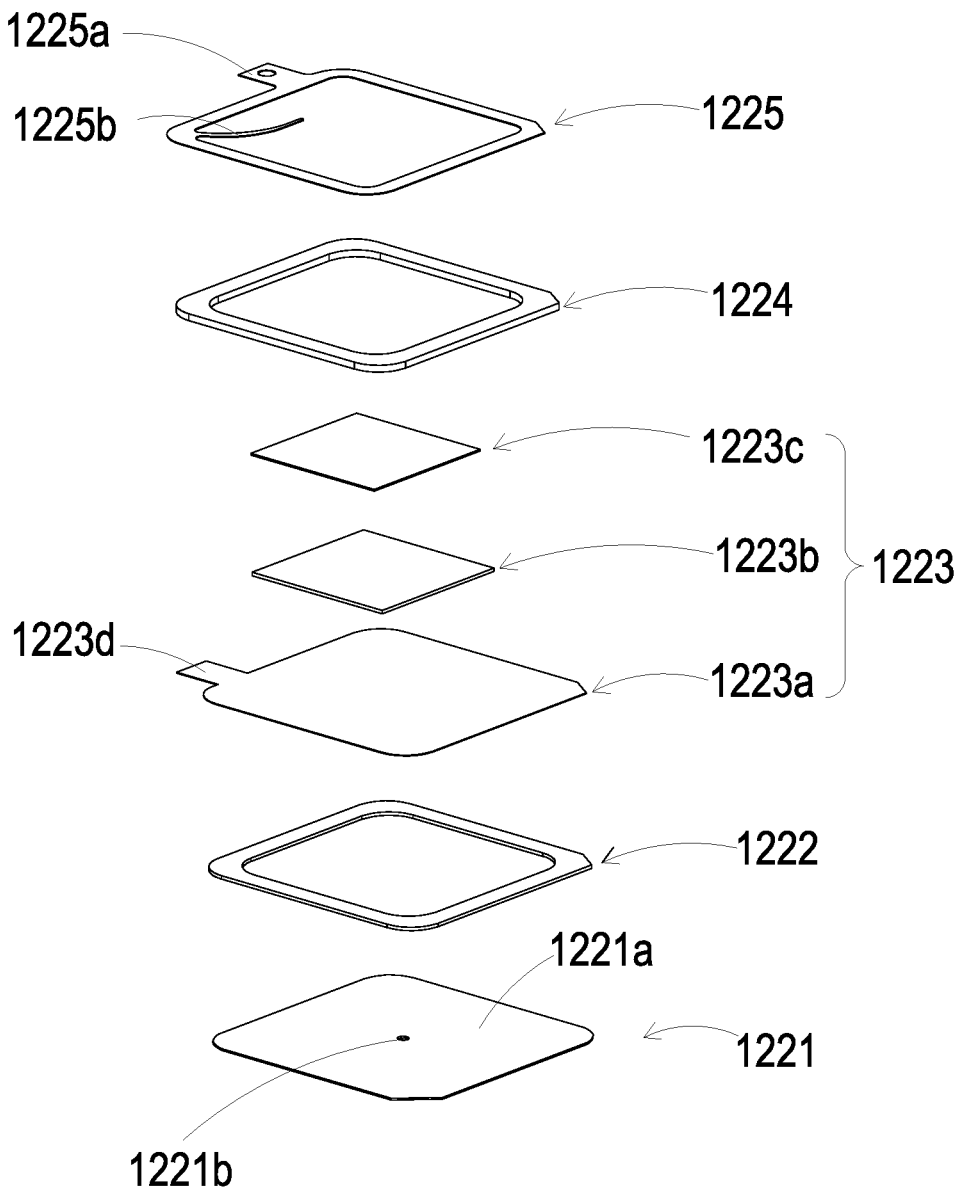
FIG. 8A is a schematic exploded front view illustrating the piezoelectric actuator according to the embodiment of the present disclosure.
Figure 8B:
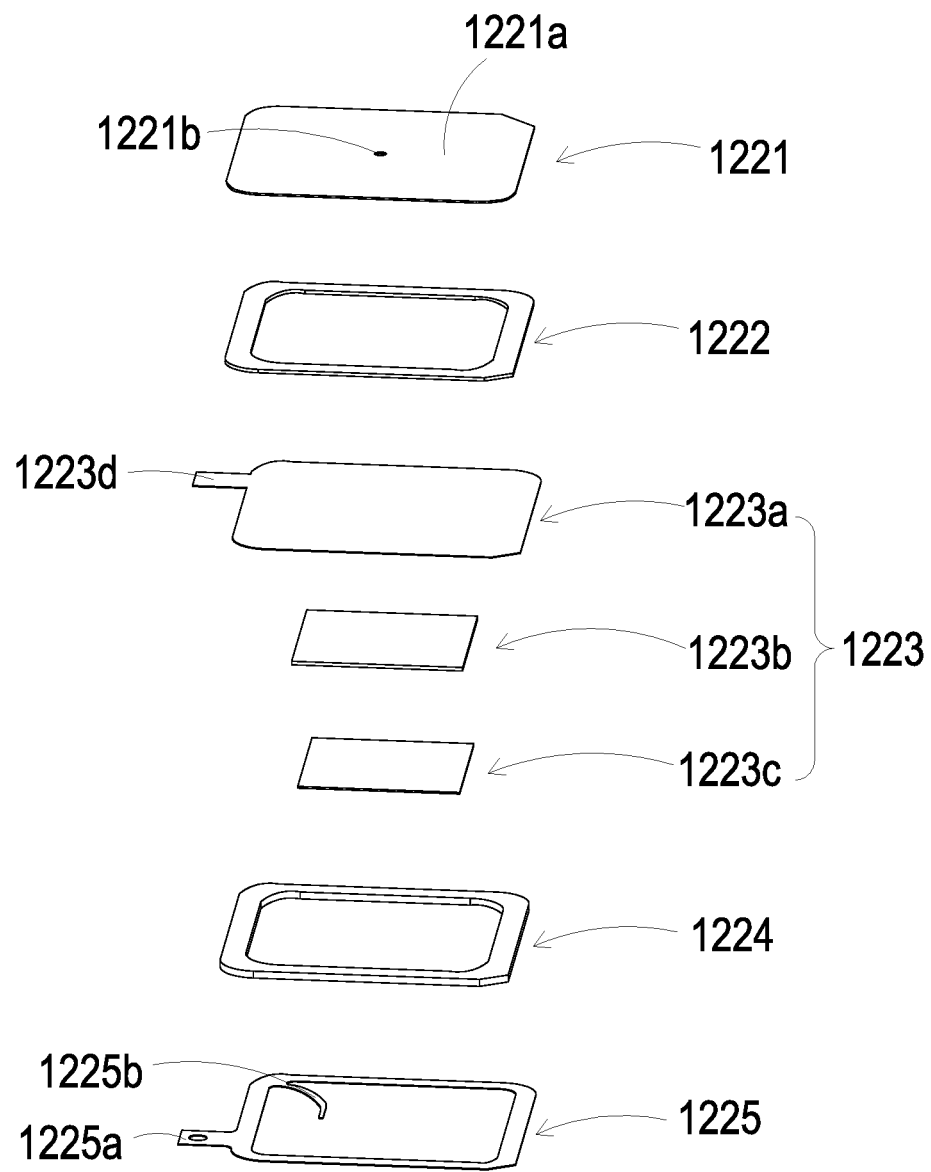
FIG. 8B is a schematic exploded rear view illustrating the piezoelectric actuator according to the embodiment of the present disclosure.

Please refer to FIG. 3, in this embodiment, the gas detection module 1 for detecting and transmitting the device inner gas detection data includes a controlling circuit board 11, a gas detection main part 12, a microprocessor 13 and a communicator 14. The gas detection main part 12, the microprocessor 13 and the communicator 14 are integrally packaged on the controlling circuit board 11 and electrically connected to each other. In the embodiment, the microprocessor 13 and the communicator 14 are mounted on the controlling circuit board 11. The microprocessor 13 controls the driving signal of the gas detection main part 12 to enable the detection operation and receives the device inner gas detection data of the air pollutant B detected by the gas detection module 1. The microprocessor 13 receives the device inner gas detection data for calculating, externally transmitting by the communicator 14, and transforming the detection data into a detecting information for storing. The communicator 14 receives the device inner gas detection data outputted by the microprocessor 13, and externally transmitted the device inner gas detection data to the cloud processing device 4 or an external device through a communication transmission. Preferably but not exclusively, the external device is a portable mobile device. The plurality of gas processing devices are driven by the cloud processing device 4 to filter and purify the air pollutant, thereby the air pollutant B in indoor space A can be filtered rapidly to obtain a clean, safe and breathable air condition. The communicator 14 described above is connected and transmitted a signal to the cloud processing device 4. The transmitted signal is adjustable based on the predetermined size of the indoor space A. Preferably but not exclusively, the communication transmission of the communicator 14 may be a wired mutual communication transmission, such as a USB communication transmission, mini-USB communication transmission, micro-USB communication transmission, or a wireless mutual communication transmission, such as Wi-Fi communication transmission, Bluetooth communication transmission, a radio frequency identification (RFID) communication transmission, or a near field communication (NFC) transmission.

Preferably but not exclusively, the air pollutant B of the present disclosure is one selected from the group consisting of suspended particles, carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, virus and a combination thereof.

Please refer to FIGS. 4A to 9A. In the embodiment, the gas detection main part 12 includes a base 121, a piezoelectric actuator 122, a driving circuit board 123, a laser component 124, a particulate sensor 125, an outer cover 126 and a gas sensor 127a. The base 121 includes a first surface 1211, a second surface 1212, a laser loading region 1213, a gas-inlet groove 1214, a gas-guiding-component loading region 1215 and a gas-outlet groove 1216. In the embodiment, the first surface 1211 and the second surface 1212 are two surfaces opposite to each other. In the embodiment, the laser loading region 1213 is hollowed out from the first surface 1211 toward the second surface 1212. The outer cover 126 covers the base 121, and includes a side plate 1261. The side plate 1261 has an inlet opening 1261a and an outlet opening 1261b. The gas-inlet groove 1214 is concavely formed from the second surface 1212 and disposed adjacent to the laser loading region 1213. The gas-inlet groove 1214 includes a gas-inlet 1214a and two lateral walls. The gas-inlet 1214a is in communication with an environment outside the base 121, and is spatially corresponding in position to an inlet opening 1261a of the outer cover 126. Two transparent windows 1214b are opened on the two lateral walls and is in communication with the laser loading region 1213. Therefore, the first surface 1211 of the base 121 is covered and attached by the outer cover 126, and the second surface 1212 is covered and attached by the driving circuit board 123, so that an inlet path is defined by the gas-inlet groove 1214.

In the embodiment, the gas-guiding-component loading region 1215 mentioned above is concavely formed from the second surface 1212 and in communication with the gas-inlet groove 1214. A ventilation hole 1215a penetrates a bottom surface of the gas-guiding-component loading region 1215. The gas-guiding-component loading region 1215 includes four positioning protrusions 1215b disposed at four corners of the gas-guiding-component loading region 1215, respectively. In the embodiment, the gas-outlet groove 1216 includes a gas-outlet 1216a, and the gas-outlet 1216a is spatially corresponding to the outlet opening 1261b of the outer cover 126. The gas-outlet groove 1216 includes a first section 1216b and a second section 1216c. The first section 1216b is concavely formed out from the first surface 1211 on a region spatially corresponding to a vertical projection area of the gas-guiding-component loading region 1215. The second section 1216c is hollowed out from the first surface 1211 to the second surface 1212 in a region where the first surface 1211 is extended from the vertical projection area of the gas-guiding-component loading region 1215. The first section 1216b and the second section 1216c are connected to form a stepped structure. Moreover, the first section 1216b of the gas-outlet groove 1216 is in communication with the ventilation hole 1215a of the gas-guiding-component loading region 1215, and the second section 1216c of the gas-outlet groove 1216 is in communication with the gas-outlet 1216a. In that, when first surface 1211 of the base 121 is attached and covered by the outer cover 126, and the second surface 1212 of the base 121 is attached and covered by the driving circuit board 123, the gas-outlet groove 1216 and the driving circuit board 123 collaboratively define an outlet path.

In the embodiment, the laser component 124 and the particulate sensor 125 are disposed on the driving circuit board 123 and located within the base 121. In order to clearly describe and illustrate the positions of the laser component 124 and the particulate sensor 125 in the base 121, the driving circuit board 123 is specifically omitted. The laser component 124 is accommodated in the laser loading region 1213 of the base 121, and the particulate sensor 125 is accommodated in the gas-inlet groove 1214 of the base 121 and is aligned to the laser component 124. In addition, the laser component 124 is spatially corresponding to the transparent window 1214b, therefore a light beam emitted by the laser component 124 passes through the transparent window 1214b and is irradiated into the gas-inlet groove 1214. A light beam path emitted from the laser component 124 passes through the transparent window 1214b and extends in an orthogonal direction perpendicular to the gas-inlet groove 1214. In the embodiment, a projecting light beam emitted from the laser component 124 passes through the transparent window 1214b and enters the gas-inlet groove 1214 to irradiate the suspended particles contained in the gas passing through the gas-inlet groove 1214. When the suspended particles contained in the gas are irradiated and generate scattered light spots, the scattered light spots are received and calculated by the particulate sensor 125 to obtain the gas detection information. In the embodiment, the gas sensor 127a is positioned and disposed on the driving circuit board 123, electrically connected to the driving circuit board 123, and accommodated in the gas-outlet groove 1216, so as to detect the air pollutant B introduced into the gas-outlet groove 1216. Preferably but not exclusively, in an embodiment, the gas sensor 127a includes a volatile-organic-compound sensor detecting carbon dioxide ($CO_2$) or volatile organic compounds (TVOC) information. Preferably but not exclusively, in an embodiment, the gas sensor 127a includes a formaldehyde sensor for detecting formaldehyde (HCHO) gas information. Preferably but not exclusively, in an embodiment, the gas sensor 127a includes a bacteria sensor for detecting bacteria or fungi information. Preferably but not exclusively, in an embodiment, the gas sensor 127a includes a virus sensor for detecting virus gas information.

In the embodiment, the piezoelectric actuator 122 is accommodated in the square-shaped gas-guiding-component loading region 1215 of the base 121. Moreover, the gas-guiding-component loading region 1215 of the base 121 is in fluid communication with the gas-inlet groove 1214. When the piezoelectric actuator 122 is enabled, the gas in the gas-inlet groove 1214 is inhaled by the piezoelectric actuator 122, so that the gas flows into the piezoelectric actuator 122, and is transported into the gas-outlet groove 1216 through the ventilation hole 1215a of the gas-guiding-component loading region 1215. In the embodiment, the driving circuit board 123 covers the second surface 1212 of the base 121. The laser component 124 is positioned and disposed on the driving circuit board 123 and electrically connected to the driving circuit board 123. The particulate sensor 125 is also positioned and disposed on the driving circuit board 123 and electrically connected to the driving circuit board 123. When the outer cover 126 covers the base 121, the inlet opening 1261a is spatially corresponding to the gas-inlet 1214a of the base 121, and the outlet opening 1261b is spatially corresponding to the gas-outlet 1216a of the base 121.

In the embodiment, the piezoelectric actuator 122 includes a gas-injection plate 1221, a chamber frame 1222, an actuator element 1223, an insulation frame 1224 and a conductive frame 1225. In the embodiment, the gas-injection plate 1221 is made by a flexible material and includes a suspension plate 1221a and a hollow aperture 1221b. The suspension plate 1221a is a sheet structure and is permitted to undergo a bending deformation. Preferably but not exclusively, the shape and the size of the suspension plate 1221a are accommodated in the inner edge of the gas-guiding-component loading region 1215, but not limited thereto. The hollow aperture 1221b passes through a center of the suspension plate 1221a, so as to allow the gas to flow therethrough. Preferably but not exclusively, in the embodiment, the shape of the suspension plate 1221a is selected from the group consisting of a square, a circle, an ellipse, a triangle and a polygon.

In the embodiment, the chamber frame 1222 is carried and stacked on the gas-injection plate 1221. In addition, the shape of the chamber frame 1222 is corresponding to the gas-injection plate 1221. The actuator element 1223 is carried and stacked on the chamber frame 1222. A resonance chamber 1226 is collaboratively defined by the actuator element 1223, the chamber frame 1222 and the suspension plate 1221a and is formed between the actuator element 1223, the chamber frame 1222 and the suspension plate 1221a. The insulation frame 1224 is carried and stacked on the actuator element 1223 and the appearance of the insulation frame 1224 is similar to that of the chamber frame 1222. The conductive frame 1225 is carried and stacked on the insulation frame 1224, and the appearance of the conductive frame 1225 is similar to that of the insulation frame 1224. In addition, the conductive frame 1225 includes a conducting pin 1225a and a conducting electrode 1225b. The conducting pin 1225a is extended outwardly from an outer edge of the conductive frame 1225, and the conducting electrode 1225b is extended inwardly from an inner edge of the conductive frame 1225.

Moreover, the actuator element 1223 further includes a piezoelectric carrying plate 1223a, an adjusting resonance plate 1223b and a piezoelectric plate 1223c. The piezoelectric carrying plate 1223a is carried and stacked on the chamber frame 1222. The adjusting resonance plate 1223b is carried and stacked on the piezoelectric carrying plate 1223a. The piezoelectric plate 1223c is carried and stacked on the adjusting resonance plate 1223b. The adjusting resonance plate 1223b and the piezoelectric plate 1223c are accommodated in the insulation frame 1224. The conducting electrode 1225b of the conductive frame 1225 is electrically connected to the piezoelectric plate 1223c. In the embodiment, the piezoelectric carrying plate 1223a and the adjusting resonance plate 1223b are made by a conductive material. The piezoelectric carrying plate 1223a includes a piezoelectric pin 1223d. The piezoelectric pin 1223d and the conducting pin 1225a are electrically connected to a driving circuit (not shown) of the driving circuit board 123, so as to receive a driving signal, such as a driving frequency and a driving voltage. Through this structure, a circuit is formed by the piezoelectric pin 1223d, the piezoelectric carrying plate 1223a, the adjusting resonance plate 1223b, the piezoelectric plate 1223c, the conducting electrode 1225b, the conductive frame 1225 and the conducting pin 1225a for transmitting the driving signal. Moreover, the insulation frame 1224 is insulated between the conductive frame 1225 and the actuator element 1223, so as to avoid the occurrence of a short circuit. Thereby, the driving signal is transmitted to the piezoelectric plate 1223c. After receiving the driving signal such as the driving frequency and the driving voltage, the piezoelectric plate 1223c deforms due to the piezoelectric effect, and the piezoelectric carrying plate 1223a and the adjusting resonance plate 1223b are further driven to generate the bending deformation in the reciprocating manner.

As described above, the adjusting resonance plate 1223b is located between the piezoelectric plate 1223c and the piezoelectric carrying plate 1223a and served as a cushion between the piezoelectric plate 1223c and the piezoelectric carrying plate 1223a. Thereby, the vibration frequency of the piezoelectric carrying plate 1223a is adjustable. Basically, the thickness of the adjusting resonance plate 1223b is greater than the thickness of the piezoelectric carrying plate 1223a, and the vibration frequency of the actuator element 1223 can be adjusted by adjusting the thickness of the adjusting resonance plate 1223b.

Please refer to FIG. 7A, FIG. 7B, FIG. 8A, FIG. 8B and FIG. 9A. In the embodiment, the gas-injection plate 1221, the chamber frame 1222, the actuator element 1223, the insulation frame 1224 and the conductive frame 1225 are stacked and positioned in the gas-guiding-component loading region 1215 sequentially, so that the piezoelectric actuator 122 is supported and positioned in the gas-guiding-component loading region 1215. Moreover, a plurality of clearances 1221c are defined between the suspension plate 1221a of the gas-injection plate 1221 and an inner edge of the gas-guiding-component loading region 1215 for gas flowing therethrough.

A flowing chamber 1227 is formed between the gas-injection plate 1221 and the bottom surface of the gas-guiding-component loading region 1215. The flowing chamber 1227 is in communication with the resonance chamber 1226 between the actuator element 1223, the chamber frame 1222 and the suspension plate 1221a through the hollow aperture 1221b of the gas-injection plate 1221. By controlling the vibration frequency of the gas in the resonance chamber 1226 to be close to the vibration frequency of the suspension plate 1221a, the Helmholtz resonance effect is generated between the resonance chamber 1226 and the suspension plate 1221a, so as to improve the efficiency of gas transportation. When the piezoelectric plate 1223c is moved away from the bottom surface of the gas-guiding-component loading region 1215, the suspension plate 1221a of the gas-injection plate 1221 is driven to move away from the bottom surface of the gas-guiding-component loading region 1215 by the piezoelectric plate 1223c. In that, the volume of the flowing chamber 1227 is expanded rapidly, the internal pressure of the flowing chamber 1227 is decreased to form a negative pressure, and the gas outside the piezoelectric actuator 122 is inhaled through the clearances 1221c and enters the resonance chamber 1226 through the hollow aperture 1221b. Consequently, the pressure in the resonance chamber 1226 is increased to generate a pressure gradient. Moreover, when the suspension plate 1221a of the gas-injection plate 1221 is driven by the piezoelectric plate 1223c to move toward the bottom surface of the gas-guiding-component loading region 1215, the gas in the resonance chamber 1226 is discharged out rapidly through the hollow aperture 1221b, and the gas in the flowing chamber 1227 is compressed, thereby the converged gas is quickly and massively ejected out of the flowing chamber 1227 under the condition close to an ideal gas state of the Benulli's law, and transported to the ventilation hole 1215a of the gas-guiding-component loading region 1215.

Figure 9A:
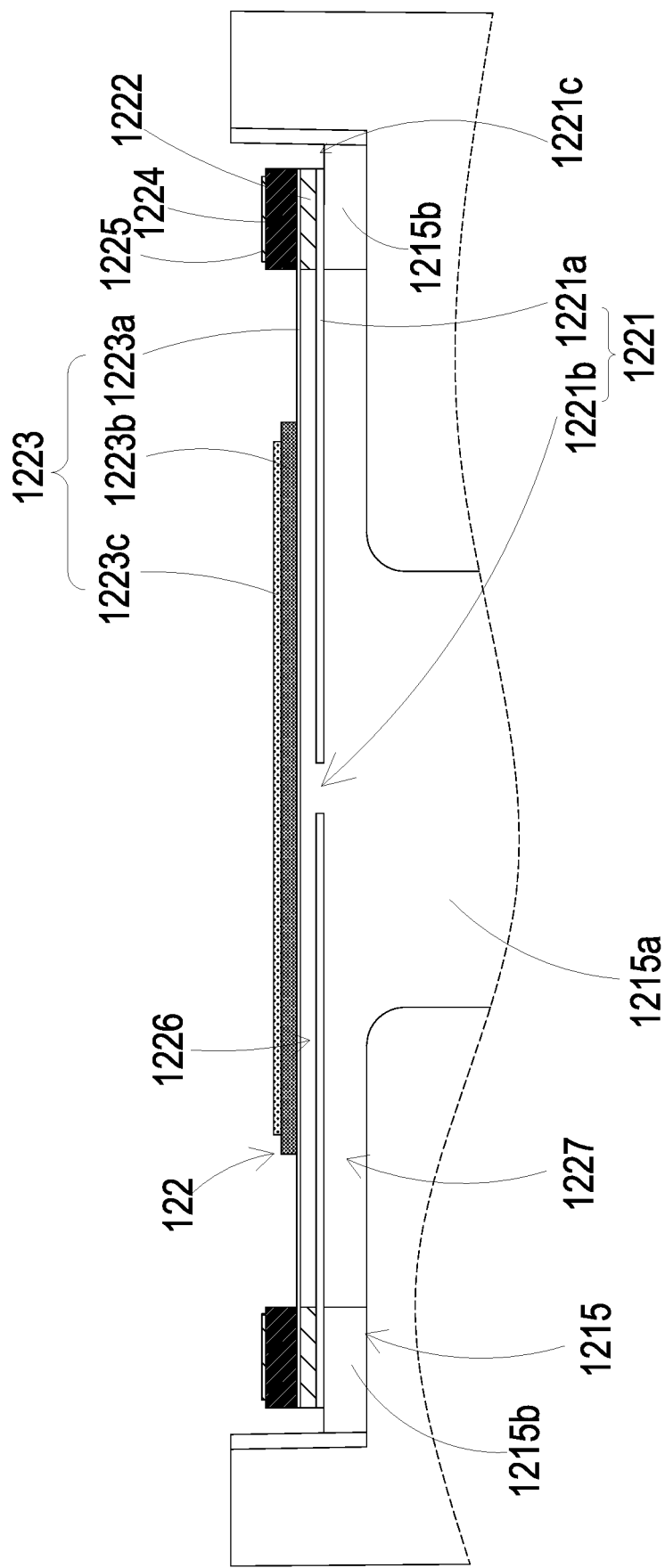
FIG. 9A is a schematic cross-sectional view illustrating the piezoelectric actuator according to the embodiment of the present disclosure.
Figure 9B:
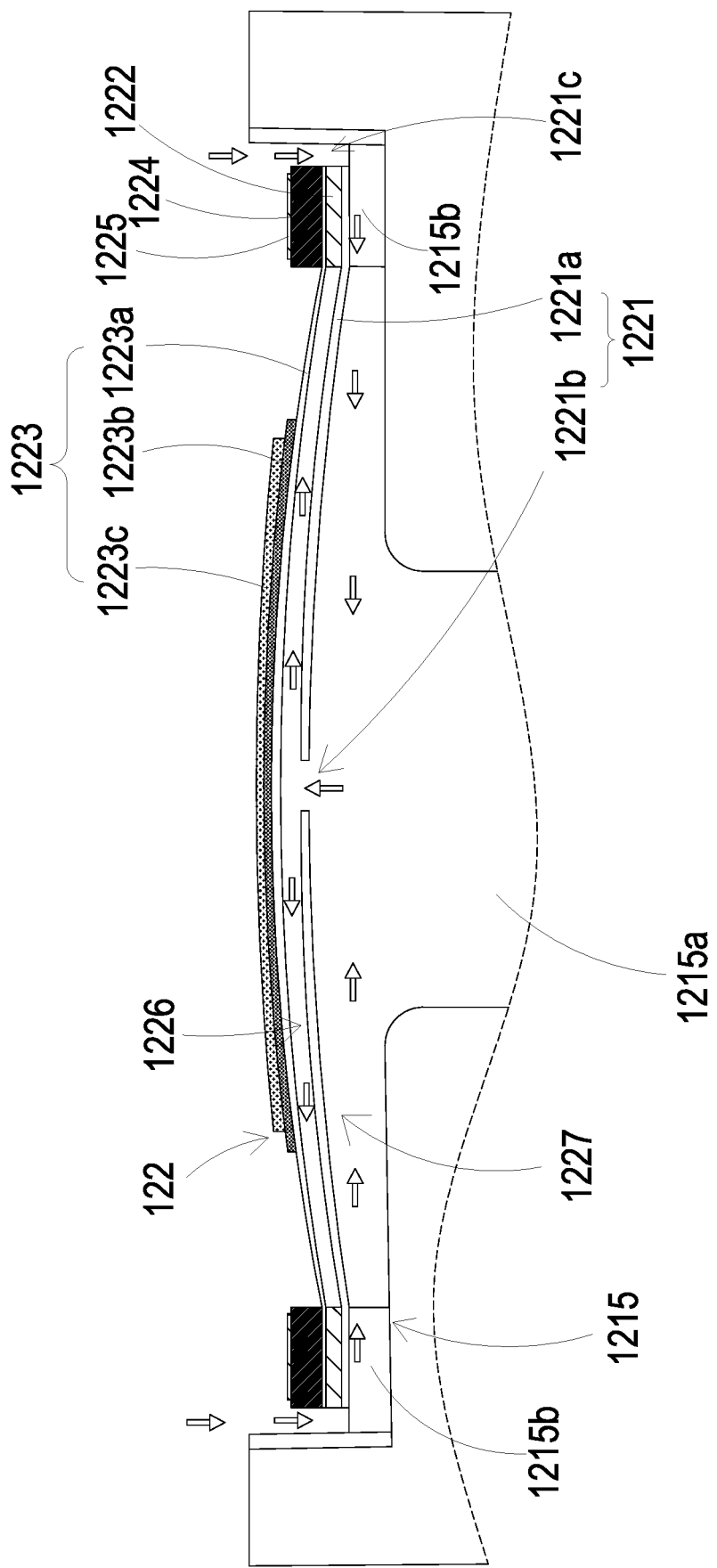
FIG. 9B is a schematic cross-sectional view illustrating the first operation step of the piezoelectric actuator according to the embodiment of the present disclosure.
Figure 9C:
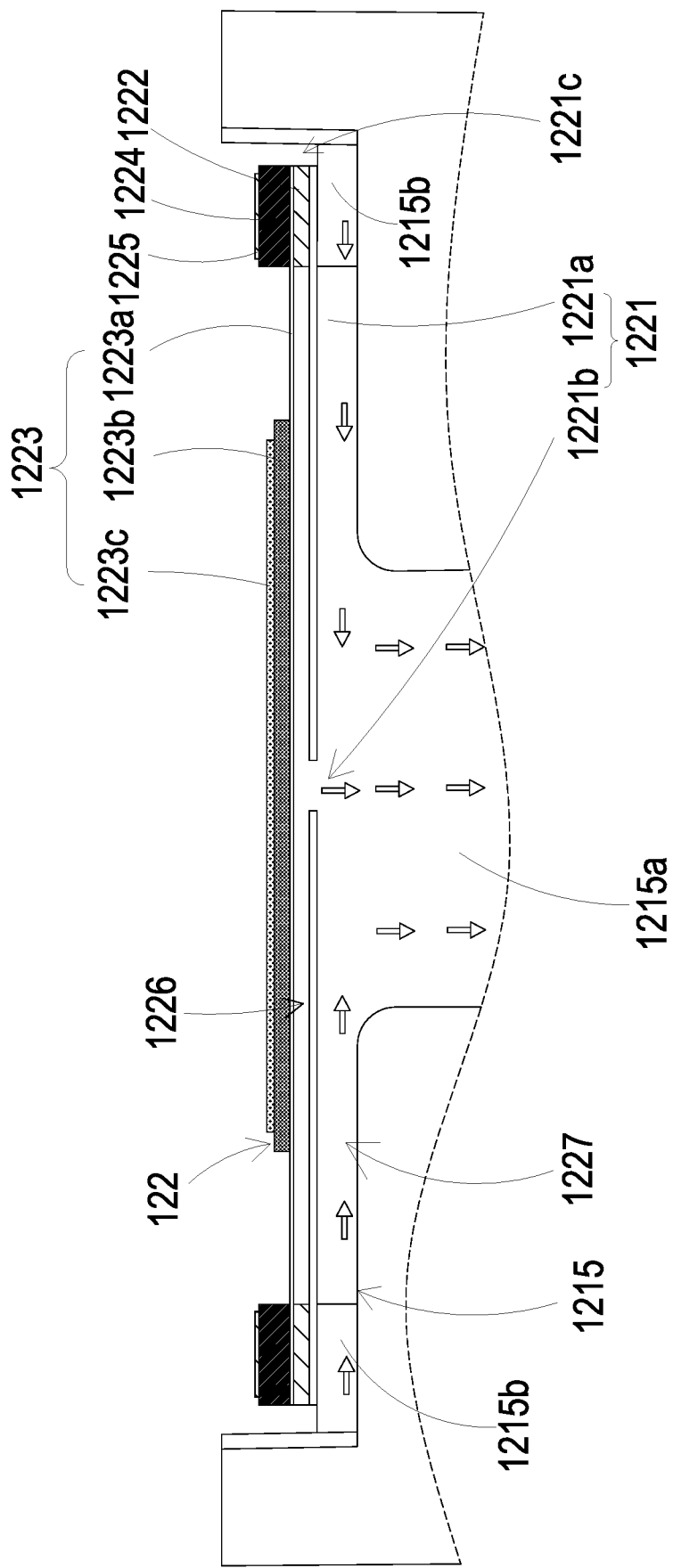
FIG. 9C is a schematic cross-sectional view illustrating the second operation step of the piezoelectric actuator according to the embodiment of the present disclosure.
Figure 10A:
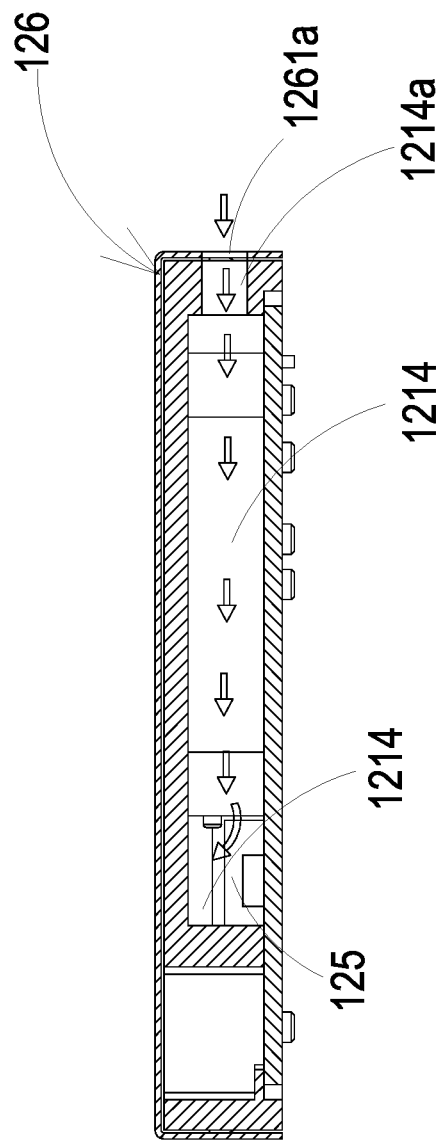
FIG. 10A is a schematic cross-sectional view illustrating the first operation step of the gas detection main part according to the embodiment of the present disclosure.
Figure 10B:
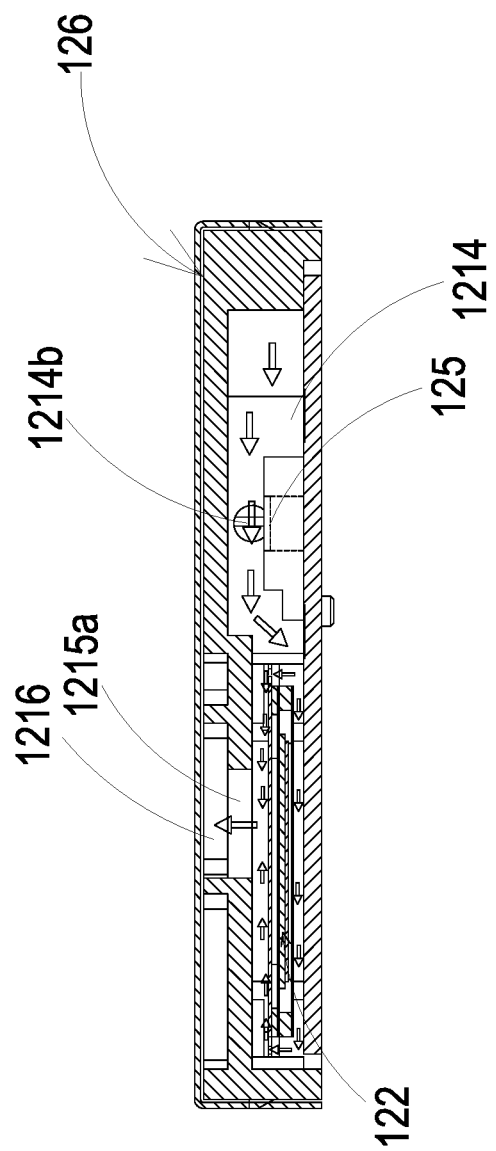
FIG. 10B is a schematic cross-sectional view illustrating the second operation step of the gas detection main part according to the embodiment of the present disclosure.
Figure 10C:
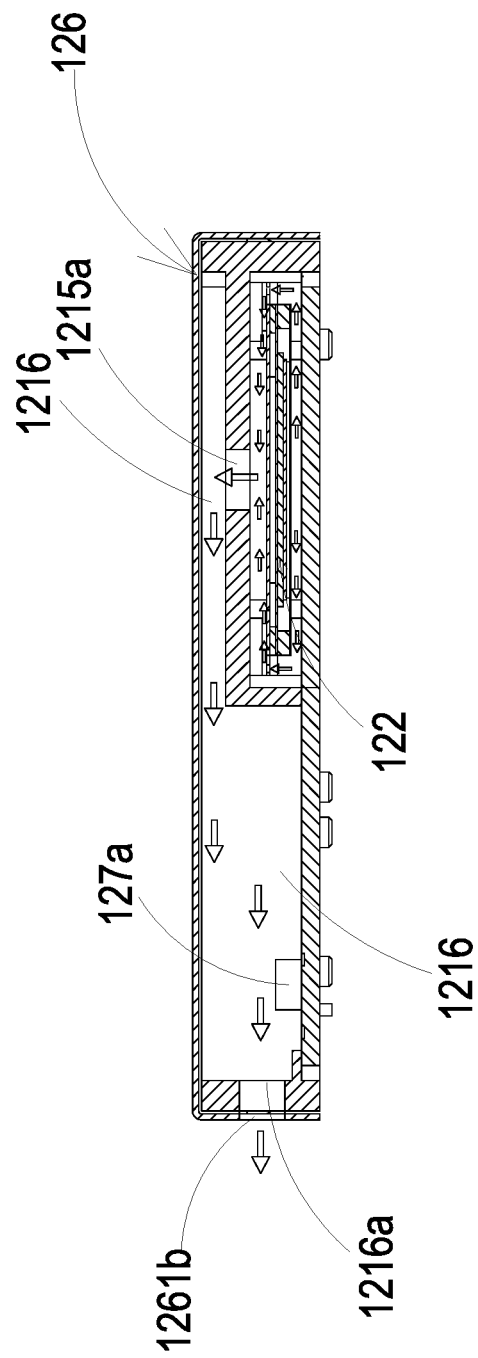
FIG. 10C is a schematic cross-sectional view illustrating the third operation step of the gas detection main part according to the embodiment of the present disclosure.
Figure 11:
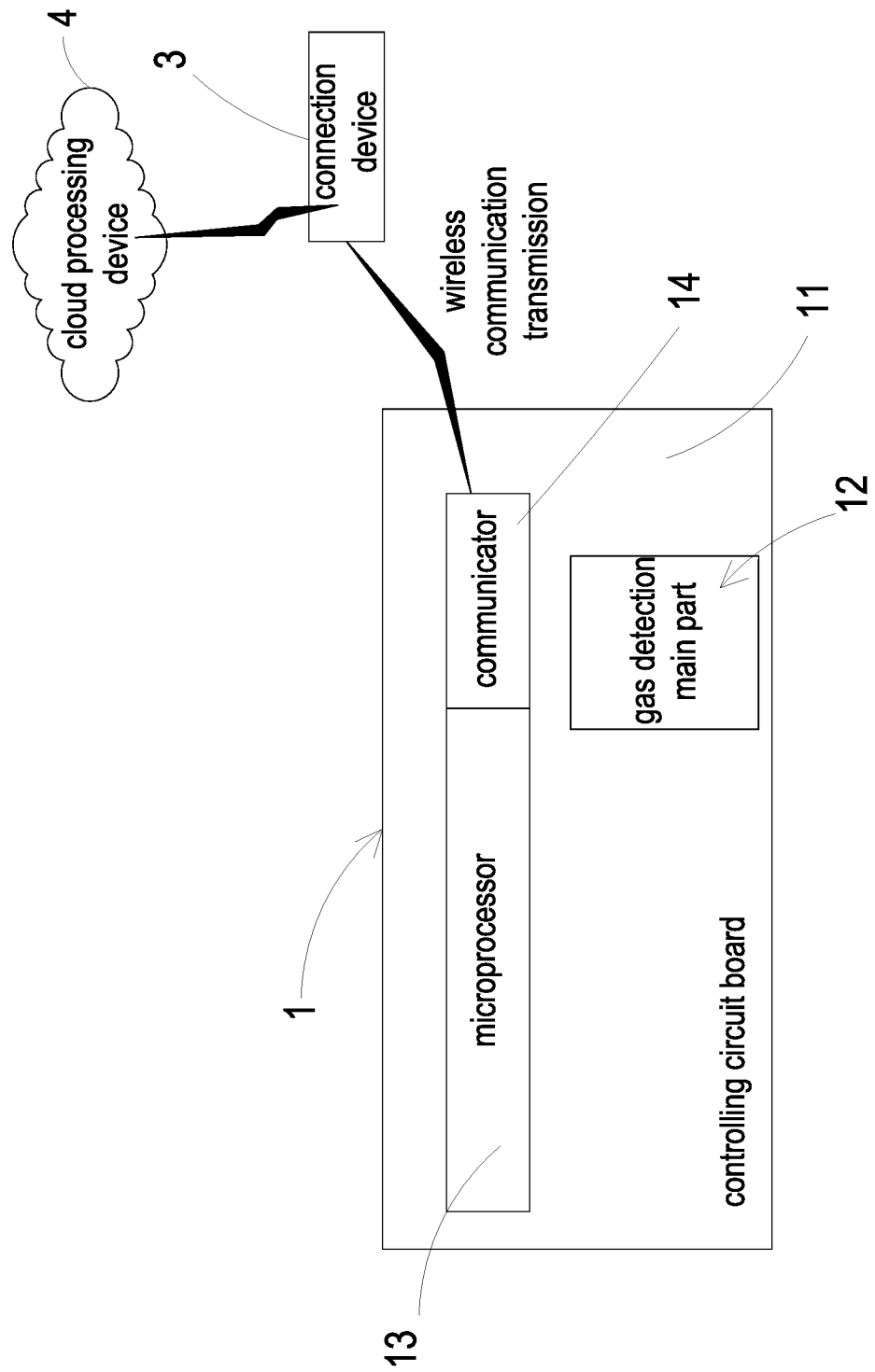
FIG. 11 is a schematic view illustrating a signal transmission path between the gas detection module and a connection device according to the embodiment of the present disclosure.

By repeating the above operation steps shown in FIG. 9B and FIG. 9C, the piezoelectric plate 1223c is driven to generate the bending deformation in a reciprocating manner. According to the principle of inertia, since the gas pressure inside the resonance chamber 1226 is lower than the equilibrium gas pressure after the converged gas is ejected out, the gas is introduced into the resonance chamber 1226 again. Moreover, the vibration frequency of the gas in the resonance chamber 1226 is controlled to be close to the vibration frequency of the piezoelectric plate 1223c, so as to generate the Helmholtz resonance effect to achieve the gas transportation at high speed and in large quantities.

The gas is inhaled through the inlet opening 1261a of the outer cover 126, flows into the gas-inlet groove 1214 of the base 121 through the gas-inlet 1214a, and is transported to the position of the particulate sensor 125. Furthermore, the piezoelectric actuator 122 is enabled continuously to inhale the gas into the inlet path, and facilitate the gas to be introduced rapidly, flow stably, and transported above the particulate sensor 125. At this time, a projecting light beam emitted from the laser component 124 passes through the transparent window 1214b to irritate the suspended particles contained in the gas flowing above the particulate sensor 125 in the gas-inlet groove 1214. When the suspended particles contained in the gas are irradiated and generate scattered light spots, the scattered light spots are received and calculated by the particulate sensor 125 for obtaining related information about the sizes and the concentration of the suspended particles contained in the gas. Moreover, the gas above the particulate sensor 125 is continuously driven and transported by the piezoelectric actuator 122, flows into the ventilation hole 1215a of the gas-guiding-component loading region 1215, and is transported to the gas-outlet groove 1216. After the gas flows into the gas-outlet groove 1216, the gas is continuously transported into the gas-outlet groove 1216 by the piezoelectric actuator 122, and the gas of the gas-outlet groove 1216 is pushed to discharge out through the gas-outlet 1216a and the outlet opening 1261b.

Please refer to FIG. 2C. The above-mentioned filter unit 2 for filtering the air pollutant B can be implemented in the combination of various embodiments. For example, the filter unit 2 includes a high efficiency particulate air (HEPA) filter screen 21a. The gas introduced into the filter unit 2 is filtered through the HEPA filter screen 21a to absorb the chemical smoke, bacteria, dust particles and pollen contained in the gas to achieve the effects of filtering and purifying the gas. In some embodiments, the HEAP filter screen 21a is coated with a cleansing factor containing chlorine dioxide to inhibit viruses, bacteria, fungi, influenza A virus, influenza B virus, enterovirus or norovirus in the gas introduced into the filter unit 2 or outside the filter unit 2. The inhibition rate can reach more than 99%. It is helpful of reducing the cross-infection of viruses. In other embodiments, the HEPA filter screen 21a is coated with a herbal protective layer extracted from ginkgo and Japanese *Rhus chinensis* to form a herbal protective anti-allergic filter, so as to resist allergy effectively and destroy a surface protein of influenza virus, such as H1N1 influenza virus, in the gas introduced into the filter unit 2 and passing through HEPA filter screen 21a. In some other embodiments, the HEPA filter screen 21a is coated with a silver ion to inhibit viruses and bacteria contained in the gas introduced by the filter unit 2.

In an embodiment, the filter unit 2 includes a photo-catalyst unit 21b combined with the HEPA filter screen 21a. The photo-catalyst unit 21b includes a photo-catalyst 211b and an ultraviolet lamp 212b. The photo-catalyst 211b is irradiated with the ultraviolet lamp 212b to decompose the gas introduced into the filter unit 2 for filtering and purifying. In the embodiment, the photo-catalyst 211b and the ultraviolet lamp 212b are spaced apart from each other at a distance. In the embodiment, the outdoor gas is introduced into the filter unit 2 and the photo-catalyst 211b is irradiated by the ultraviolet lamp 212b to convert light energy into chemical energy, thereby harmful gases in the gas is decomposed and disinfects bacteria contained therein, so as to achieve the effects of filtering and purifying the introduced gas.

In an embodiment, the filter unit 2 includes a photo-plasma unit 21c combined with the HEPA filter screen 21a. The photo-plasma unit 21c includes a nanometer irradiation tube. The gas introduced into the filter unit 2 is irradiated by the nanometer irradiation tube to decompose volatile organic gases contained in the gas and purify the gas. When the outdoor gas is introduced into the filter unit 2, the gas is irradiated by the nanometer irradiation tube, thereby decomposes oxygen molecules and water molecules contained in the gas into high oxidizing photo-plasma, and generates an ion flow capable of destroying organic molecules. In that, volatile formaldehyde, volatile toluene and volatile organic (VOC) gases contained in the gas are decomposed into water and carbon dioxide, so as to achieve the effects of filtering and purifying the introduced gas.

In an embodiment, the filter unit 2 includes a negative ionizer 21d combined with the HEPA filter screen 21a. The negative ionizer 21d includes at least one electrode wire 211d, at least one dust collecting plate 212d and a boost power supply device 213d. When a high voltage is discharged through the electrode wire 211d, the suspended particles contained in the gas introduced into the filter unit 2 are attached to the dust collecting plate 212d for filtering and purifying. When the at least one electrode wire 211d is provided with a high voltage to discharge by the boost power supply device 213d, the dust collecting plate 212d is carry with negative charge. When the outdoor gas is introduced by the filter unit 2, the at least one electrode wire 211d discharges to make the suspended particles in the gas to carry with positive charge, and therefore the suspended particles with positive charge are adhered to the dust collecting plate 212d with negative charges, so as to achieve the effects of filtering and purifying the introduced gas.

In an embodiment, the filter unit 2 includes a plasma ion unit 21e combined with the HEPA filter screen 21a. The plasma ion unit 21e includes a first electric-field protection screen 211e, an adsorption filter screen 212e, a high-voltage discharge electrode 213e, a second electric-field protection screen 214e and a boost power supply device 215e. The boost power supply device 215e provides a high voltage to the high-voltage discharge electrode 213e to discharge and form a high-voltage plasma column with plasma ion, so that the plasma ion of the high-voltage plasma column decomposes viruses or bacteria contained in the gas introduced into the filter unit 2. In the embodiment, the first electric-field protection screen 211e, the adhering filter screen 212e, the high-voltage discharge electrode 213e and the second electric-field protection screen 214e are disposed within the filter unit 2. The adhering filter screen 212e and the high-voltage discharge electrode 213e are located between the first electric-field protection screen 211e and the second electric-field protection screen 214e. As the high-voltage discharge electrode 213e is provided with a high voltage by the boost power supply 215e, a high-voltage plasma column with plasma ion is formed. When the outdoor gas is introduced into the filter unit 2, oxygen molecules and water molecules contained in the gas are decomposed into positive hydrogen ions ($H^+$) and negative oxygen ions ($O_2^-$) by the plasma ion. The substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced gas and achieve the effects of filtering and purifying.

Notably, the filter unit 2 can only include the HEPA filter screen 21a, or includes the HEPA filter screen 21a combined with any one of the photo-catalyst unit 21b, the photo-plasma unit 21c, the negative ionizer 21d and the plasma ion unit 21e. In an embodiment, the purification unit 21 includes the HEPA filter screen 21a combined with any two of the photo-catalyst unit 21b, the photo-plasma unit 21c, the negative ionizer 21d and the plasma ion unit 21e. Alternatively, the HEPA filter screen 21a combined with any three of the photo-catalyst unit 21b, the photo-plasma unit 21c, the negative ionizer 21d and the plasma ion unit 21e. In other embodiment, the purification unit 21 includes the HEPA filter screen 21a combined with all of the photo-catalyst unit 21b, the photo-plasma unit 21c, the negative ionizer 21d and the plasma ion unit 21e.

In summary, according to the above descriptions, the present disclosure provides a method of filtering indoor air pollution. The cloud processing device 4 receives device inner gas detection data of every gas processing devices, and selects one gas processing devices with the highest device inner gas detection data of the air pollutant B as the selected gas processing device (one of the gas processing devices 1a to 1e) closest to the air pollutant B for driving. The cloud processing device 4 transmits a control instruction to the connection device 3, and the connection device 3 then transmits the control instruction to the gas processing device (one of the gas processing devices 1a to 1e) closest to the air pollutant B and drive it. Also, the connection device 3 intelligently selects the activation and operation time of the gas processing device (one of the gas processing devices 1a to 1e) closest to the air pollutant B, so as to implement the air pollutant filtration of the air pollutant B.

In addition, the cloud processing device 4 intelligently compares every device inner gas detection data to determine a convection path for the air pollutant B, selects and transmits a control instruction to the connection device 3, and then intelligently selects and drives at least one of the plurality of gas processing devices within the indoor space A to generate at least one airflow according to the convection path. The at least one airflow accelerates the movement of the air pollutant B in the convection path, so that the air pollutant B can move towards the closest gas processing device (one of the gas processing devices 1a to 1e) adjacent to the air pollutant B for filtering the air pollutant.

What is claimed is:

1. A method of filtering indoor air pollution for filtering air pollutant in an indoor space, comprising:
    a) providing a plurality of gas processing devices, wherein the gas processing device comprises a gas detection module and a filter unit, the gas processing device is implemented for detecting air pollutant, the filter unit is for filtering the air pollutant, and the gas processing device transmits at least one device inner gas detection data and comprises a controlling circuit board, a gas detection main part, a microprocessor and a communicator, and the gas detection main part comprises:
    a base comprising:
    a first surface;
    a second surface opposite to the first surface;
    a laser loading region;
    a gas-inlet groove disposed adjacent to the laser loading region, wherein the gas-inlet groove comprises two lateral walls, and a transparent window is opened on the two lateral walls and is in communication with the laser loading region;
    a gas-guiding-component loading region in communication with the gas-inlet groove, wherein a ventilation hole penetrates a bottom surface of the gas-guiding-component loading region, and
    a gas-outlet groove concavely formed from the first surface in a region spatially corresponding to the bottom surface of the gas-guiding-component loading region, and in communication with the ventilation hole;

a piezoelectric actuator accommodated in the gas-guiding-component loading region;

a laser component accommodated in the laser loading region, wherein a light beam path emitted from the laser component passes through the transparent window and extends in a direction perpendicular to the gas-inlet groove; and a particulate sensor disposed at a position where the gas-inlet groove orthogonally intersects with the light beam path of the laser component, so as to detect the suspended particles contained in the air pollution passing through the gas-inlet groove and irradiated by a projecting light beam emitted from the laser component;

b) providing a connection device for receiving and transmitting the at least one device inner gas detection data to a cloud processing device, wherein the cloud processing device intelligently compares and selects to drive a closest gas processing device adjacent to the air pollutant, and determines convection paths for the air pollutant; and c) intelligently selecting and controlling the plurality of gas processing devices driven by the cloud processing device and generating at least one airflow, so as to accelerate the movement of the air pollutant along the convection paths to move the air pollutant towards the closest gas processing device adjacent to the air pollutant for filtering, wherein the convection paths are in multiple directions instead of a single direction, so that the air pollutant in the indoor space can be filtered rapidly to obtain a clean, safe and breathable air condition.

2. The method of filtering indoor air pollution according to claim 1, wherein the air pollutant is one selected from the group consisting of suspended particles, carbon monoxide, carbon dioxide, ozone, sulfur dioxide, nitrogen dioxide, lead, total volatile organic compounds (TVOC), formaldehyde, bacteria, fungi, virus and a combination thereof.

3. The method of filtering indoor air pollution according to claim 1, wherein the cloud processing device receives the at least one device inner gas detection data, and the gas processing devices with the highest inner gas detection data is selected as the closest gas processing device to be driven, wherein the cloud processing device transmits a control instruction to the connection device, and the connection device transmits the control instruction to the closest gas processing device adjacent to the air pollutant to drive the closest gas processing device, so as to intelligently select and control the activation and operation time of the closest gas processing device adjacent to the air pollutant for implementing the air pollutant filtration.

4. The method of filtering indoor air pollution according to claim 3, wherein after the cloud processing device intelligently compared the device inner gas detection data, the cloud processing device transmits the control instruction to the connection devices and intelligently selects and drives at least one of the gas processing devices to generate the at least one airflow according to the convection path for the air pollutant, so as to accelerate the movement of the air pollutant along the convection path to move the air pollutant towards the closest gas processing device adjacent to the air pollutant for filtering the air pollutant.

5. The method of filtering indoor air pollution according to claim 1, wherein the gas detection main part, the microprocessor and the communicator are integrally packaged on the controlling circuit board and electrically connected to the controlling circuit board, wherein the microprocessor controls detection operations of the gas detection main part, the gas detection main part detects the air pollutant and outputs a detection signal to the microprocessor for calculating, processing and outputting the at least one device inner gas detection data to the communicator for transmitting the at least one device inner gas detection data externally through a wireless communication transmission.

6. The method of filtering indoor air pollution according to claim 5, wherein the gas detection main part comprises:
the base comprising:
the laser loading region hollowed out from the first surface to the second surface;
the gas-inlet groove concavely formed from the second surface, wherein the gas-inlet groove comprises a gas-inlet, the gas-inlet is in communication with an environment outside the base;
the gas-guiding-component loading region concavely formed from the second surface, and
the gas-outlet groove hollowed out from the first surface to the second surface in a region where the first surface is not aligned with the gas-guiding-component loading region, wherein a gas-outlet is disposed in the gas-outlet groove and in communication with the environment outside the base;
the piezoelectric actuator guiding the air pollutant to be flowed in the gas-inlet groove;
a driving circuit board covering and attaching to the second surface of the base;
the laser component positioned on the driving circuit board electrically connected to the driving circuit board;
the particulate sensor positioned on the driving circuit board, electrically connected to the driving circuit board;
a gas sensor positioned on the driving circuit board, electrically connected to the driving circuit board, and accommodated in the gas-outlet groove, so as to detect the air pollutant introduced into the gas-outlet groove; and
an outer cover covering the base and comprising a side plate, wherein the side plate has an inlet opening and an outlet opening, the inlet opening is spatially corresponding to the gas-inlet, and the outlet opening is spatially corresponding to the gas-outlet;
wherein the outer cover covers the base, and the driving circuit board covers the second surface, so that an inlet path is defined by the gas-inlet groove, and an outlet path is defined by the gas-outlet groove, so that the air pollutant is inhaled from the environment outside the base by the piezoelectric actuator, transported into the inlet path defined by the gas-inlet groove through the inlet opening, and passes through the particulate sensor to detect the particle concentration of the suspended particles contained in the air pollutant, and the air pollutant is transported into the outlet path defined by the gas-outlet groove through the ventilation hole, passes through the gas sensor for detecting, and then discharged out of the gas detection main part through the outlet opening.

7. The method of filtering indoor air pollution according to claim 1, wherein the particulate sensor detects suspended particulate information.

8. The method of filtering indoor air pollution according to claim 6, wherein the gas sensor comprises one selected from the group consisting of a volatile-organic-compound sensor, a formaldehyde sensor, a bacteria sensor, a virus sensor and a combination thereof, wherein the volatileorganic-compound sensor detects carbon dioxide or volatile organic compounds information, the formaldehyde sensor detects formaldehyde gas information, the bacteria sensor detects bacteria or fungi information, and the virus sensor detects virus gas information.

9. The method of filtering indoor air pollution according to claim 1, wherein the filter unit is disposed inside the gas processing device for filtering the air pollutant passed thereby, and the filter unit is a high efficiency particulate air (HEPA) filter screen.

10. The method of filtering indoor air pollution according to claim 9, wherein the HEPA filter screen is coated with a cleansing factor containing chlorine dioxide layer, so as to inhibit viruses and bacteria contained in the air pollutant.

11. The method of filtering indoor air pollution according to claim 9, wherein the HEPA filter screen is coated with an herbal protective layer extracted from ginkgo and Japanese *Rhus chinensis* to form an herbal protective anti-allergic filter, so as to resist allergy and destroy a surface protein of influenza virus passing through the HEPA filter screen.

12. The method of filtering indoor air pollution according to claim 9, wherein the HEPA filter screen is coated with a silver ion to inhibit viruses and bacteria contained in the air pollutant.

13. The method of filtering indoor air pollution according to claim 9, wherein the filter unit is combined with a photo-catalyst unit, a photo-plasma unit, a negative ionizer, a plasma ion unit, or a combination thereof.

14. The method of filtering indoor air pollution according to claim 5, wherein the wireless communication transmission comprises one selected from the group consisting of Wi-Fi communication transmission, a Bluetooth communication transmission, a RF ID communication transmission and a NFC transmission.

15. The method of filtering indoor air pollution according to claim 1, wherein the connection device receives and transmits the at least one device inner gas detection data through a wireless communication transmission.

16. The method of filtering indoor air pollution according to claim 15, wherein the wireless communication transmission is transmitted through Bluetooth communication transmission, and the connection device is a mobile device.

17. The method of filtering indoor air pollution according to claim 15, wherein the wireless communication transmission is transmitted through Wi-Fi communication transmission, and the connection device is a routing telecommunication network device.

18. The method of filtering indoor air pollution according to claim 1, wherein the gas processing device is one selected from the group consisting of an air-exchanger, an air-cleaner, an air-conditioner, an exhauster and a ventilator.

* * * * *